(12) United States Patent
Minamikawa

(10) Patent No.: US 10,814,662 B2
(45) Date of Patent: Oct. 27, 2020

(54) LAMINATE, PERSONAL VERIFICATION MEDIUM, AND METHOD OF PRODUCING THE LAMINATE

(71) Applicant: TOPPAN PRINTING CO., LTD., Tokyo (JP)

(72) Inventor: Naoki Minamikawa, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 82 days.

(21) Appl. No.: 16/154,228

(22) Filed: Oct. 8, 2018

(65) Prior Publication Data

US 2019/0039401 A1 Feb. 7, 2019

Related U.S. Application Data

(63) Continuation of application No. PCT/JP2017/015237, filed on Apr. 14, 2017.

(30) Foreign Application Priority Data

Apr. 14, 2016 (JP) ................................ 2016-081361

(51) Int. Cl.

| | |
|---|---|
| *B32B 3/00* | (2006.01) |
| *B42D 25/328* | (2014.01) |
| *B32B 7/02* | (2019.01) |
| *G02B 5/18* | (2006.01) |
| *B42D 25/45* | (2014.01) |

(Continued)

(52) U.S. Cl.

CPC ............ *B42D 25/328* (2014.10); *B23K 26/00* (2013.01); *B32B 7/02* (2013.01); *B32B 27/08* (2013.01); *B42D 25/45* (2014.10); *G02B 5/18* (2013.01); *H01S 5/18* (2013.01); *B32B 2307/402* (2013.01); *G02B 2005/1804* (2013.01)

(58) Field of Classification Search

CPC .......... B42D 25/45; B42D 25/328; G02B 5/18
See application file for complete search history.

(56) References Cited

FOREIGN PATENT DOCUMENTS

| | | |
|---|---|---|
| DE | 10 2007 012 696 A | 9/2008 |
| JP | 10-272874 A | 10/1998 |

(Continued)

OTHER PUBLICATIONS

International Search Report regarding PCT/JP2017/015237, dated Jul. 11, 2017, 2 pps.

(Continued)

*Primary Examiner* — Elizabeth E Mulvaney
(74) *Attorney, Agent, or Firm* — Foley & Lardner LLP

(57) ABSTRACT

A laminate includes a diffraction layer that is optically transmissive and includes a diffraction part with a plurality of diffraction units being repetition of a diffraction unit in a direction extending the diffraction layer, each diffraction unit including at least one diffraction element with a reflective diffraction grating; and an absorption layer that is optically transmissive with a plurality of absorption parts for at least part of visible light, the absorption layer facing the diffraction layer with light passing between the diffraction layer and the absorption layer. The laminate has an observation side opposite where the diffraction layer faces the absorption layer; the diffraction layer has a surface serving as a front surface opposite to the surface facing the absorption layer; and in plan view perpendicular to the front surface of the diffraction layer, each of the absorption parts aligns with one of the diffraction elements.

12 Claims, 7 Drawing Sheets

(51) Int. Cl.
*B23K 26/00* (2014.01)
*B32B 27/08* (2006.01)
*H01S 5/18* (2006.01)

(56) References Cited

FOREIGN PATENT DOCUMENTS

| JP | 2002-032724 A | 1/2002 |
| JP | 2006-103221 A | 4/2006 |
| WO | WO 2012/050223 | 4/2014 |

OTHER PUBLICATIONS

Extended European Search Report dated Jan. 30, 2020 for corresponding Application No. 17782498.4.

LAMINATE, PERSONAL VERIFICATION MEDIUM, AND METHOD OF PRODUCING THE LAMINATE

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2017/015237, filed on Apr. 14, 2017, which is based upon and claims the benefit of priority to Japanese Patent Application No. 2016-081361, filed on Apr. 14, 2016, the disclosures of which are all hereby incorporated herein by reference in their entireties.

TECHNICAL FIELD

The present invention relates to a laminate, a personal verification medium that is a laminate containing personal information attributed to a particular individual, and a method of producing the laminate.

BACKGROUND

Background Art

Media having a laser color development layer and a hologram layer are known to be used as personal verification media, such as cards and passports. The laser color development layer has characteristics of changing its color to black by absorbing a laser beam having a particular wavelength. The laser color development layer is used for writing information, such as a face image, belonging to a particular individual. The hologram layer is configured to display an image having predetermined colors, according to the change in refractive index or the asperities of the hologram layer (e.g., refer to PTL 1).

CITATION LIST

Patent Literature

PTL 1: WO 2012/050223 A1

SUMMARY OF THE INVENTION

Technical Problem

The hologram layer affixed to a personal verification medium is configured to display an image of predetermined colors. To display images that are different between hologram layers of respective personal verification media, hologram layers with different configurations have to be formed for the respective media. In other words, when a hologram layer forms a predetermined image conforming to the asperities thereof, the configuration of the image displayed on the hologram layer is limited by the configuration of the asperities. Hence, a personal verification medium that is now sought is one that enhances the degree of freedom in the configuration of the image displayed on the hologram layer, relative to the configuration of the asperities.

The matters described above are common not only to laminates for use as personal verification media, but also to laminates having a diffraction layer that emits light of predetermined color conforming to the asperities of the layer (e.g., laminates used for games and other applications).

An object of the present invention is to provide a laminate that allows a greater degree of freedom in the configuration of an image relative to the configuration of a diffraction layer, a personal verification medium, and a method of producing the laminate.

[Intended Solution to Problem]

A laminate for solving the issues set forth above includes: a diffraction layer that is optically transmissive and includes a diffraction part configured by a plurality of diffraction units, the plurality of diffraction units being repetition of a diffraction unit in a direction of extending the diffraction layer, each diffraction unit including at least one diffraction element configured by a reflective diffraction grating; and an absorption layer that is optically transmissive and includes a plurality of absorption parts that absorb at least part of visible light, the absorption layer facing the diffraction layer in a state where light passes between the diffraction layer and the absorption layer. In the laminate, the laminate has an observation side that is opposite to a side where the diffraction layer faces the absorption layer, and the diffraction layer has a surface serving as a front surface on a side opposite to the surface facing the absorption layer. In a plan view perpendicular to the front surface of the diffraction layer, each of the absorption parts aligns with corresponding one of the diffraction elements.

A personal verification medium for attempting to solve the issues set forth above includes a laminate that includes personal information belonging to a particular individual. In the personal verification medium, the laminate is the laminate described above. The laminate is configured to display the personal information by absorption of light into the absorption parts and emission of diffracted light from part of the diffraction elements aligning with the respective absorption parts, in a plan view perpendicular to the front surface of the diffraction layer.

According to the configuration described above, of the plurality of diffraction elements, some diffraction elements align with respective absorption parts in a plan view perpendicular to the front surface of the diffraction layer. Light that has passed through these diffraction elements is absorbed by the respective absorption parts. Therefore, the light that has passed through the diffraction element is controlled in terms of reflection or scattering at the interface between the diffraction layer and another layer, or at the interface between the absorption layer and another layer. Thus, when the light emitted from the diffraction elements aligning with the respective absorption parts is visually recognized, the diffracted light emitted from the diffraction elements is unlikely to mix with light other than the diffracted light. In this way, the diffracted light emitted from the diffraction elements aligning with the respective absorption parts exhibits a high chroma level compared to the light emitted from other diffraction elements. Thus, the laminate is able to display an image formed of the light with high chroma level. Thus, the laminate described above can enhance the degree of freedom in the configuration of an image relative to the configuration of the diffraction layer.

In the laminate described above, it is preferred that the absorption layer has characteristics of developing color in response to laser beam radiation, and the absorption parts correspond to portions that have developed color in response to the laser beam radiation.

According to the configuration described above, the absorption parts can be formed on the absorption layer, with the diffraction layer being permitted to face the absorption layer. Thus, positional accuracy of the absorption parts is enhanced relative to the respective diffraction elements provided to the diffraction layer, compared to the configuration in which positioning of an absorption layer is performed relative to a diffraction layer after formation of the absorption parts on the absorption layer.

In the laminate described above, the absorption layer may contact the diffraction layer, the absorption layer may have a surface contacting the diffraction layer and serving as a front surface, and the absorption parts may be exposed to the front surface of the absorption layer.

According to the configuration described above, light that has passed through the diffraction layer in the portions of the absorption layer where the absorption parts are located is controlled in terms of reflection or scattering at the interface between the diffraction layer and the absorption layer, compared with a configuration in which the absorption parts are located inner than the surface of the absorption layer. Thus, the diffracted light emitted from the diffraction elements aligning with the respective absorption parts is more likely to exhibit higher chroma level in a plan view perpendicular to the front surface of the diffraction layer. As a result, the image displayed on the laminate becomes sharper.

In the laminate described above, each of the diffraction units is configured by a first diffraction element, a second diffraction element, and a third diffraction element. The diffraction grating configuring each diffraction element has a spatial frequency that is different between the first diffraction element, the second diffraction element, and the third diffraction element. Difference in the spatial frequency between the diffraction elements and direction of repeating a unit structure contained in each of the diffraction elements are preferred to be so determined that red diffracted light of the first diffraction element, green diffracted light of the second diffraction element, and blue diffracted light of the third diffraction element are simultaneously emitted toward a fixed point on the observation side.

According to the configuration described above, each diffraction unit is configured by the first diffraction element emitting red diffracted light, the second diffraction element emitting green diffracted light, and the third diffraction element emitting blue diffracted light. Hence, the color of emitted light can be varied between the diffraction units, making use of additive color mixing of the red light, the green light, and the blue light.

In the laminate, it is preferred that each of the diffraction elements is in a circular shape or in an elliptical shape, in a plan view perpendicular to the front surface of the diffraction layer.

A laser beam used for forming the absorption parts mostly has a circular or elliptical cross section in a direction perpendicular to the direction of extending the laser beam. Thus, according to the configuration described above, the shape of each absorption part can be easily made substantially analogous to the shape of the corresponding diffraction element, in a plan view perpendicular to the front surface of the diffraction layer. This facilitates adjustment of a ratio of the area of the absorption parts to the area of the diffraction elements in a plan view perpendicular to the front surface of the diffraction layer.

In the laminate described above, it is preferred that the diffraction layer includes a detection target emitting light; and the detection target is so configured that a detection device detects a position of the detection target in a plan view perpendicular to the front surface of the diffraction layer, based on light emitted from the detection target.

A method of producing a laminate for solving the issues set forth above includes: preparing a diffraction layer that is optically transmissive and includes a diffraction part and a detection target; preparing an absorption layer that is optically transmissive and has characteristics of developing color in response to laser beam radiation; permitting the diffraction layer to face the absorption layer; detecting a position of the detection target in a plan view perpendicular to the front surface of the diffraction layer by using a detection device; determining portions of the absorption layer to be irradiated with the laser beam with reference to the position of the detection target; and irradiating the absorption layer with the laser beam to form absorption parts.

According to the configuration described above, when applying a laser beam to the absorption layer that faces the diffraction layer, portions of the absorption layer to be irradiated with the laser beam can be determined based on the position of the detection target in the diffraction layer.

In the laminate described above, the detection target is an optical element. The detection target may be at least one selected from a group consisting of a diffraction element diffracting light, a reflection control element controlling reflection of light, an isotropic scattering element isotropically scattering light, an anisotropic scattering element anisotropically scattering light, a lens element refracting light, and a polarized reflection element selectively reflecting predetermined polarized light.

According to the configuration described above, the position of the detection target can be detected, based on the characteristics of light emitted from each optical element.

In the laminate described above, it is preferred that the diffraction layer has an uneven surface, and the diffraction part and the detection target are located on the uneven surface.

According to the configuration described above, the diffraction part and the detection target, which are located on a continuous uneven surface, can be simultaneously formed. This enhances positional accuracy of the detection target relative to the position of the diffraction part, leading to the enhancement in positional accuracy of the absorption parts, which are formed based on the position of the detection target, with respect to the positions of the diffraction elements.

Desired Advantageous Effects of the Invention

According to the present invention, the degree of freedom is enhanced in the configuration of an image, relative to the configuration of a diffraction layer.

DETAILED DESCRIPTION

Figure 1:
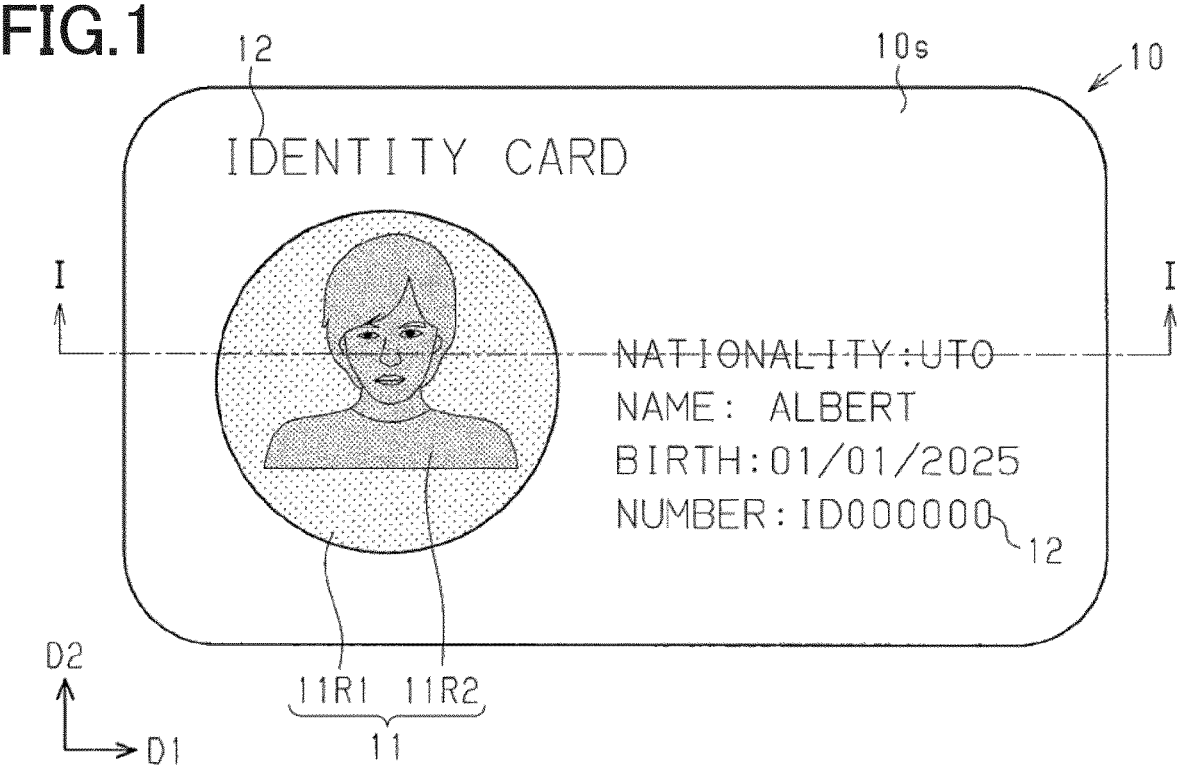
FIG. 1 is a plan view illustrating a structure of a personal verification medium according to a first embodiment in which a laminate and a personal verification medium are embodied.

With reference to the drawings, a preferred or representative embodiment of the present invention will be described in detail. It is to be understood that the present invention is not limited to the following embodiment, which is intended to be representative of the present invention. The representative embodiment described below is merely an example of the present invention, and the design thereof could be appropriately changed, modified, and varied by one skilled in the art. In the embodiment, the same or corresponding components are denoted by the same reference characters, and duplicate description thereof will be omitted.

First Embodiment

With reference to FIGS. 1 to 8, a first embodiment embodying a laminate, a personal verification medium, and a method of producing the laminate will be described. Description is sequentially given of a personal verification medium as an example of a laminate, a method of producing the personal verification medium as an example of a method of producing the laminate, and examples.

(Configuration of Personal Verification Medium)

Referring to FIGS. 1 to 4, a configuration of a personal verification medium will be described. A personal verification medium is used for authenticating a particular individual who owns the personal verification medium i.e. the owner.

As shown in FIG. 1, a personal verification medium 10 has a two-dimensionally extending plate shape, and includes a front surface 10s which also extends two-dimensionally. In plan view perpendicular to the front surface 10s, a diffraction layer 11 is located in part of the personal verification medium 10, and a printed part 12 is located at a position that is different from that of the diffraction layer 11. In other words, the personal verification medium 10 has a plate shape extending in a first direction D1 and a second direction D2 perpendicular to the first direction D1.

The diffraction layer 11 is elliptical in plan perpendicular to the front surface 10s, and is made up of a first area 11R1 and a second area 11R2. The second area 11R2 is used for displaying, by diffracted light, a face-and-shoulders image as an example of personal information of the owner of the personal verification medium 10, while the first area 11R1 is used for filling the portion other than the second area 11R2 of the diffraction layer 11, and for emitting diffracted light to the outside of the personal verification medium 10. The diffraction layer 11 may be non-elliptical, e.g., polygonal, in plan view perpendicular to the front surface 10s.

The printed part 12 contains character information such as the name of the personal verification medium 10, and nationality, name, date of birth, personal number of the owner, and the like.

Figure 2:
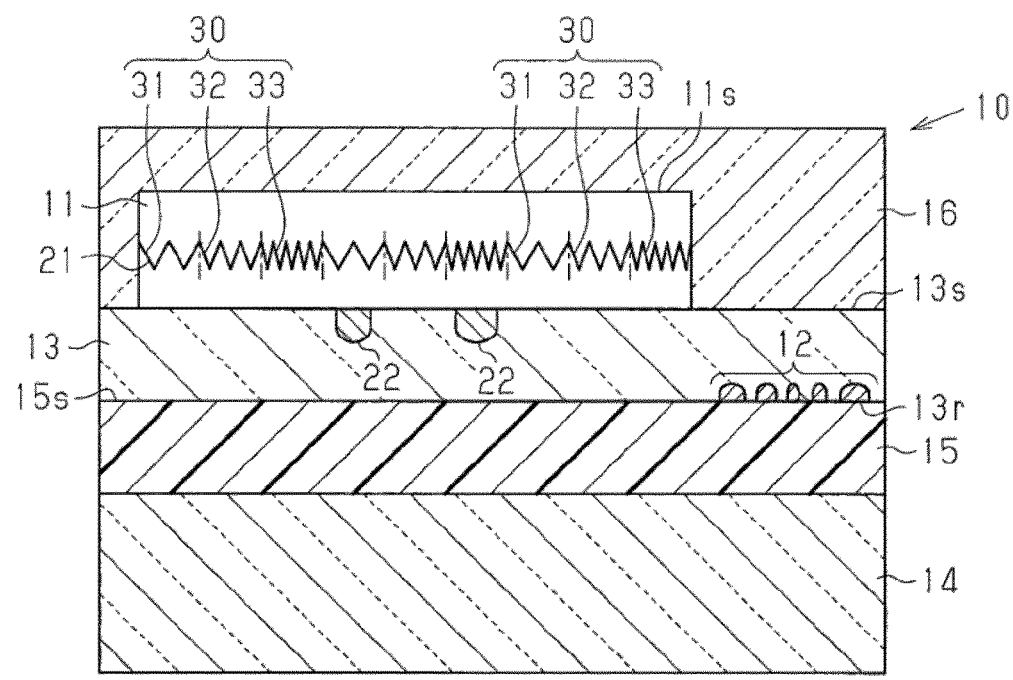
FIG. 2 is a cross-sectional view taken along the line I-I of FIG. 1.

FIG. 2 shows a cross-sectional structure of the personal verification medium 10 taken along the line I-I of FIG. 1. In FIG. 2, the size of the diffraction layer 11 relative to the thickness and the size of the personal verification medium 10 is exaggerated for clarification. In FIG. 2, the personal verification medium 10 is illustrated with the number of diffraction elements being significantly reduced in the diffraction layer 11, and with the hatching of the diffraction layer 11 being omitted for clarification of the diffraction part of the diffraction layer 11.

As shown in FIG. 2, the personal verification medium 10 includes a diffraction layer 11 and an absorption layer 13. The diffraction layer 11 is optically transmissive and includes a diffraction part 21 that is made up of a plurality of diffraction units 30. The plurality of diffraction units 30 are a repetition of a diffraction unit 30 in a direction in which the diffraction layer 11 extends, with each diffraction unit 30 being made up of at least one diffraction element configured by a reflective diffraction grating. The absorption layer 13 includes a plurality of absorption parts 22 that are optically transmissive and absorb at least part of visible light. The absorption layer 13 faces the diffraction layer 11 so that light passes therebetween. More specifically, the absorption layer 13 contacts the diffraction layer 11.

The personal verification medium 10 has an observation side that is opposite to a side where the diffraction layer 11 faces the absorption layer 13. The diffraction layer 11 has a front surface 11s which is on a side opposite to the surface facing the absorption layer 13. In plan view perpendicular to the front surface 11s of the diffraction layer 11, each of the absorption parts 22 aligns with a corresponding one of the diffraction elements. In other words, in plan view perpendicular to the front surface 11s of the diffraction layer 11, the plurality of absorption parts 22 align with the respective diffraction elements.

In plan view perpendicular to the front surface 11s of the diffraction layer 11, light that has passed through a diffraction element among the plurality of diffraction elements is absorbed by the absorption part 22 aligning with this diffraction element. Thus, the light that has passed through this diffraction element is prevented from being reflected or scattered.

Hence, when visually recognized, the light emitted from this diffraction element aligning with the absorption part 22 is unlikely to mix with light other than the diffracted light. Thus, the light emitted from this diffraction element aligning with the absorption part 22 exhibits a high chroma level, compared with the light emitted from other diffraction elements than this diffraction element in question. Therefore, the personal verification medium 10 can display an image formed of light with a higher chroma level. Resultantly, this enhances the degree of freedom in the configuration of an image relative to the configuration of the diffraction layer 11.

In other words, the personal verification medium 10 can display an image conforming to the diffraction elements respectively aligning with the absorption parts 22 and a ratio of the area of the absorption parts 22 occupied in the area of the diffraction elements, even if the diffraction layer 11 is configured by a plurality of two-dimensionally arrayed diffraction units 30 in plan view perpendicular to the front surface 11s of the diffraction layer 11.

In the diffraction layer 11, a region including diffraction units 30 among the plurality of diffraction units 30, with absorption parts 22 being aligned, corresponds to the second area 11R2 mentioned above, and a region including diffraction units 30 not aligning with absorption parts 22 corresponds to the first area 11R1 mentioned above.

The diffraction part 21 is made up of a plurality of diffraction units 30, each of which is made up of a first diffraction element 31, a second diffraction element 32, and a third diffraction element 33.

The absorption layer 13 has a front surface 13s contacting the diffraction layer 11. The absorption parts 22 are exposed to the front surface 13s of the absorption layer 13. Thus, in a portion of the absorption layer 13 where absorption parts 22 are provided, light that has passed through the diffraction layer 11 is prevented from being reflected or scattered at the interface between the diffraction layer 11 and the absorption layer 13, compared with a configuration in which absorption parts 22 are located inner than the front surface 13s of the absorption layer 13. Therefore, diffracted light emitted from the diffraction elements aligning with the respective absorption parts 22 is more likely to exhibit higher chroma level in plan view perpendicular to the front surface 11s of the diffraction layer 11. As a result, the image displayed on the personal verification medium 10 becomes sharper.

The absorption layer 13 includes a plurality of absorption parts 22, all of which are exposed to the front surface 13s of the absorption layer 13. In other words, each absorption part 22 configures part of the front surface 13s of the absorption layer 13.

The absorption layer 13 has a rear surface 13r which is on a side opposite to the front surface 13s. In the thickness direction of the absorption layer 13, each absorption part 22 extends from the front surface 13s to a position between the front and rear surfaces 13s and 13r i.e. a position a little nearer to the front surface 13s than to the rear surface 13r.

The absorption layer 13 has characteristics of developing color in response to laser beam radiation. The absorption parts 22 correspond to portions that have developed color in response to laser beam radiation to the absorption layer 13. Hence, the absorption parts 22 can be formed in the absorption layer 13 in a state where the diffraction layer 11 and the absorption layer 13 face with each other. Thus, positional accuracy of the absorption parts 22 is enhanced relative to the respective diffraction elements of the diffraction layer 11, compared to the configuration in which the absorption parts 22 are formed in the absorption layer 13 and then positioning of the absorption layer 13 is performed against the diffraction layer 11.

The absorption layer 13 is formed, for example, of polycarbonate that develops color in response to laser beam radiation. A portion of the absorption layer 13 not developing color passes, reflects, or scatters light, while the absorption parts 22 i.e. the portions that have developed color in the absorption layer 13 absorb light and has a black color, for example. Thus, in the absorption layer 13, the absorption parts 22, which are portions that have developed color, have optical properties different from those of the non-absorption part, which is a portion that has not developed color.

The absorption parts 22 are exposed to the front surface 13s of the absorption layer 13. Therefore, when the diffraction layer 11 is detached from the absorption layer 13, the trace is liable to remain. The trace of detachment of the diffraction layer 11 from the absorption layer 13 may be that part of the black absorption parts 22 adheres to the diffraction layer 11.

Hence, if a diffraction layer 11 detached from a genuine personal verification medium 10 is bonded to an absorption layer of a counterfeit or falsified personal verification medium, the personal verification medium having this diffraction layer 11 is easily determined not to be a genuine personal verification medium, due to the trace that has remained in the diffraction layer 11.

As described above, the personal verification medium 10 includes a laminate containing personal information belonging to a particular individual. The laminate is configured to display the personal information by virtue of the light absorbed by the absorption parts 22 and the diffracted light emitted from the portions where the absorption parts 22 align with the respective diffraction elements in plan view perpendicular to the front surface 11s of the diffraction layer 11.

A personal verification medium having the diffraction layer 11 inside is typically provided with a diffraction layer that has been processed to display a predetermined image. Therefore, in many cases, even those personal verification media which are used for authenticating different individuals have diffraction layers that display an image common between the media. In such a configuration, if only the diffraction layer is taken out of a genuine personal verification medium, a diffraction layer that forms the image common to the genuine personal verification medium can be affixed to a counterfeit or falsified personal verification medium. It is therefore difficult to determine authenticity of the personal verification medium, relying on the diffraction layer.

The diffraction layer 11 of the personal verification medium 10 described above is configured to have an array of diffraction units 30. This diffraction layer 11 alone merely emits diffracted light outward. However, this diffraction layer 11, when coupled with the absorption parts 22 formed in the absorption layer 13, can form a predetermined image.

Therefore, merely affixing the diffraction layer 11 taken out of a genuine personal verification medium 10 to a counterfeit or falsified personal verification medium, cannot produce a personal verification medium capable of displaying an image that is the same as the image displayed on the genuine personal verification medium 10. As a result, the personal verification medium 10 described above makes counterfeit of the personal verification medium 10 difficult.

The personal verification medium 10 further includes a first substrate 14, a second substrate 15, and a third substrate 16. In the personal verification medium 10, the first substrate 14 and the second substrate 15 are stacked. The second substrate 15 has a front surface 15s that is on a side opposite to the surface contacting the first substrate 14, and is provided with the absorption layer 13.

In plan view perpendicular to the front surface 13s of the absorption layer 13, the diffraction layer 11 is located on part of the front surface 13s, and the third substrate 16 covers part of the front surface 13s, i.e. the part not covered with the diffraction layer 11, and the entire diffraction layer 11. In plan view perpendicular to the front surface 15s of the second substrate 15, the printed part 12 is located on part of the front surface 15s i.e. the part not overlapped with the diffraction layer 11.

The third substrate 16 is optically transmissive, e.g., transparent. Similarly to the third substrate 16, the first substrate 14 is also optically transmissive, e.g., transparent, but does not necessarily have to be optically transmissive. The second substrate 15 has a white color, but may have a color other than white. The second substrate 15 preferably has a color exhibiting a sharp contrast to the colors of the absorption parts 22, more specifically, has a color exhibiting a sharp contrast to the colors of an image to be displayed on the diffraction layer 11 and the color of the printed part 12. The second substrate 15 may be optically transmissive.

Figure 3:
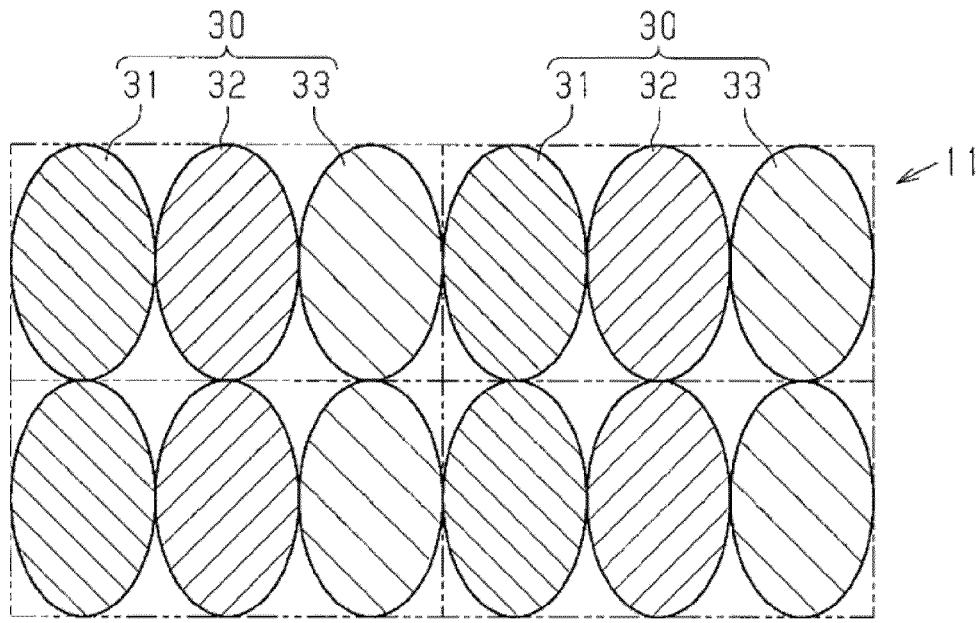
FIG. 3 is a partially enlarged plan view illustrating a structure of a diffraction layer as viewed perpendicular to a surface of a diffraction layer.

FIG. 3 is a partial plan view illustrating a structure of the diffraction layer 11 as viewed perpendicular to the front surface 11s of the diffraction layer 11, i.e. a partial plan view illustrating the first area 11R1. In FIG. 3, each diffraction element is hatched to clearly define between the first, second and third diffraction elements 31, 32 and 33 configuring each diffraction unit 30.

As shown in FIG. 3, each diffraction element is elliptical in plan view perpendicular to the front surface 11s of the diffraction layer 11. A laser beam used for forming the absorption parts 22 usually has a circular or elliptical cross section when taken along the direction perpendicular to the direction in which the laser beam extends. If each diffraction element is elliptical, it is naturally easy to make the shape of each absorption part 22 be substantially analogous to the corresponding diffraction element in plan view perpendicular to the front surface 11s of the diffraction layer 11. This facilitates control of the ratio of the area of the absorption parts 22 to the area of the diffraction elements in plan view perpendicular to the front surface 11s of the diffraction layer 11.

Each of the diffraction elements have a shape equivalent to all the rest of the diffraction elements, i.e. an elliptical shape extending in a direction, and are arrayed being in contact with the adjacent diffraction elements in a direction perpendicular to the extending direction. In other words, a plurality of diffraction elements are arrayed all over the diffraction layer 11 in plan view perpendicular to the front surface 11s thereof.

In each diffraction unit 30, the first, second and third diffraction elements 31, 32 and 33 are unidirectionally arrayed in this order, and in all the diffraction units 30, the first, second and third diffraction elements 31, 32 and 33 are arrayed in the same order.

In other words, in plan view perpendicular to the front surface 11s of the diffraction layer 11, the first, second and third diffraction elements 31, 32 and 33 are repeatedly unidirectionally arrayed in this order all over the diffraction layer 11. In contrast, in a direction perpendicular to the arrayed direction, the same kind of diffraction elements are arrayed each being in contact with adjacent diffraction elements.

For example, the plurality of diffraction units 30 are arrayed in the first and second directions D1 and D2, while the first, second and third diffraction elements 31, 32 and 33 are arrayed in this order in, e.g., the first direction D1. Also, the plurality of first diffraction elements 31 are arrayed in the second direction D2, the plurality of second diffraction elements 32 are also arrayed in the second direction D2, and the plurality of third diffraction elements 33 are also arrayed in the second direction D2.

The diffraction unit 30 has a visually recognizable size, with rays of light emitted from the first, second and third diffraction elements 31, 32 and 33 thereof being mixed with each other.

Each diffraction element is configured by a diffraction grating. The diffraction grating has a spatial frequency which is different between the first, second and third diffraction elements 31, 32 and 33. The spatial frequency of diffraction grating may be in the range of 500/mm or more to 2500/mm or less, and more preferably 1000/mm or more to 2000/mm or less. The diffraction grating may have a depth in the range of 50 nm or more to 150 nm or less. The spatial frequency is even throughout each diffraction element. The diffraction grating has a structure where unit structures each configured by an uneven surface, i.e. fine concavities and convexities, are arrayed at a predetermined pitch. The fine concavities and convexities are linearly arrayed in a direction perpendicular to, for example, the direction of arraying the diffraction elements, with the concavities and the convexities being alternated in the arraying direction.

Each diffraction unit 30 is configured as follows by setting different spatial frequencies to the respective diffraction elements and setting the direction of repeating the unit structure of each diffraction element. In other words, the diffraction layer 11 is configured such that red diffracted light of the first diffraction element 31, green diffracted light of the second diffraction element 32, and blue diffracted light of the third diffraction element 33 are simultaneously emitted toward a fixed point that is a predetermined point on the observation side.

The spatial frequency of diffraction grating refers to a pitch of forming stripes of each grating, or the number of repetitions of the unit structure per unit length. When the spatial frequency changes in a diffraction grating, a different grating color is recognized at the predetermined fixed point on the observation side, that is, the color of light emitted from the diffraction grating changes.

The first diffraction element 31 has a spatial frequency of emitting red diffracted light toward the fixed point, the second diffraction element 32 has a spatial frequency of emitting green diffracted light toward the fixed point, and the third diffraction element 33 has a spatial frequency of emitting blue diffracted light toward the fixed point. Therefore, the light emitted from each diffraction unit 30 has a white color that is a mixture of red, green and blue.

Each diffraction grating emits diffracted light toward a plane defined by the arraying direction of the concavities and the convexities and the recessing direction of the concavities, or the protruding direction of the convexities surface. Hence, if the direction of repeating the unit structure is changed in each diffraction grating, the direction of emitting diffracted light changes. Therefore, to simultaneously emit rays of diffracted light from the respective diffraction elements toward the fixed point, the direction of repeating the unit structure is required to be substantially equal between the diffraction elements.

The first, second and third diffraction elements 31, 32 and 33 each preferably have a dimension in the range of 15 μm or more to 50 μm or less in both the arraying direction of the diffraction elements and in the direction perpendicular to the arraying direction of the diffraction elements. If the dimension is 15 μm or more, the intensity of the diffracted light emitted from each diffraction element increases so as to be recognizable with the naked eye. If the dimension is 50 μm or less, the resolution of an image displayed on the diffraction layer 11 is prevented from being lowered.

As described above, the diffraction layer 11 is covered with the third substrate 16. However, since the third substrate 16 is optically transmissive, the light of each diffraction element is emitted to the observation side of the personal verification medium 10 via the third substrate 16.

Figure 4:
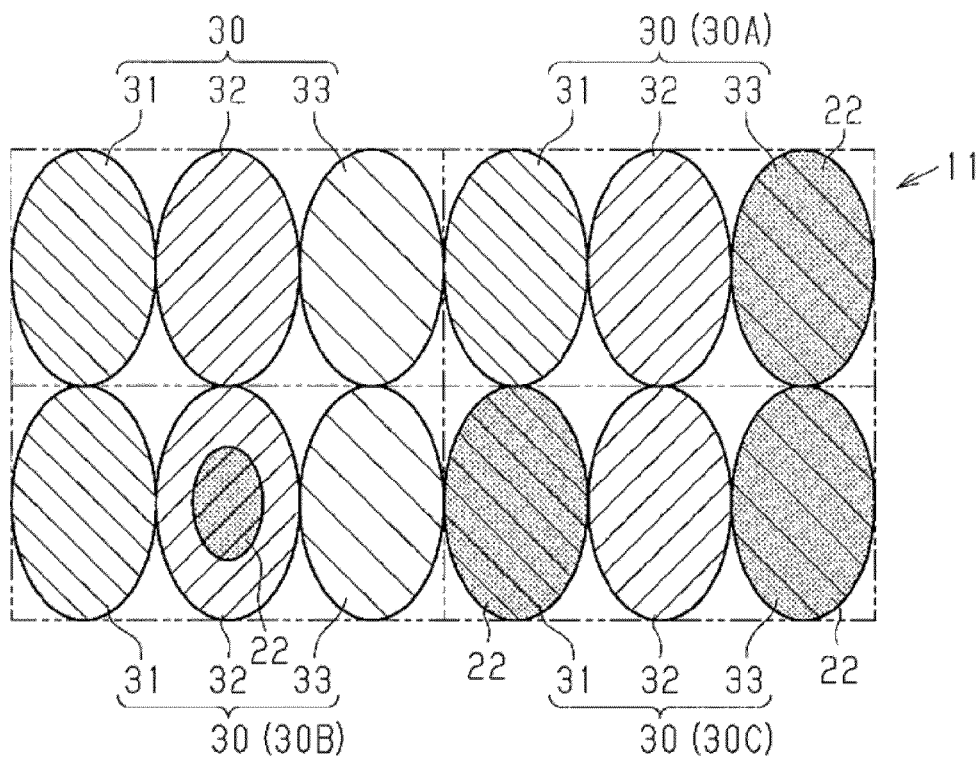
FIG. 4 is a partially enlarged plan view illustrating a structure of a diffraction layer as viewed perpendicular to a surface of a diffraction layer.

FIG. 4 is a partial plan view illustrating a structure of the diffraction layer 11 as viewed perpendicularly to the front surface 11s of the diffraction layer 11, i.e. illustrating an example of a partial plan view of the second area 11R2, together with the absorption parts 22. In FIG. 4, each diffraction element is hatched to clearly define between the first, second and third diffraction elements 31, 32 and 33 configuring each diffraction unit 30. In FIG. 4, the absorption parts 22 are dotted for clarification of the configuration where diffraction elements align with the respective absorption parts 22.

As shown in FIG. 4, a plurality of diffraction units 30 are also arrayed all over the second area 11R2 as in the first area 11R1. In plan view perpendicular to the front surface 11s of the diffraction layer 11, diffraction elements of at least part of the plurality of diffraction units 30 belonging to the second area 11R2 are in alignment with the respective absorption parts 22.

As described above, the absorption parts 22 are located in the absorption layer 13 i.e. an underlayer of the diffraction layer 11 as viewed from the observation side of the personal verification medium 10, so that the observer of the personal verification medium 10 can visually recognize diffracted light emitted from the diffraction elements aligning with the respective absorption parts 22.

The plurality of diffraction units 30 contain, for example, a first diffraction unit 30A, a second diffraction unit 30B, and a third diffraction unit 3C. Between the three diffraction units 30, the diffraction elements aligning with the respective absorption parts 22 are different in plan view perpendicular to the front surface 11s of the diffraction layer 11.

In the first diffraction unit 30A, the third diffraction element 33 among the three diffraction elements aligns with an absorption part 22. In plan view perpendicular to the front surface 11s of the diffraction layer 11, this absorption part 22 has a sufficient size and shape for fully aligning with the third diffraction element 33. In other words, this absorption part 22 has an elliptical shape substantially similar to the third diffraction element 33 in plan view perpendicular to the front surface 11s of the diffraction layer 11.

When light enters the personal verification medium 10 from the observation side, part of the light entering the diffraction layer 11 from the observation side is emitted to the observation side as light diffracted by diffraction units 30. The rest of the light that has entered the diffraction layer 11 passes through diffraction units 30. Since the diffraction layer 11 is transparent, the amount of light diffracted by the diffraction layer 11 is less than the amount of light passing therethrough, in the light that has entered therein.

In a configuration in which the diffraction elements do not align with the respective absorption parts 22 in plan view perpendicular to the front surface 11s of the diffraction layer 11, part of the light that has passed through the diffraction layer 11 is reflected or scattered at the interface between the diffraction layer 11 and the absorption layer 13 or inside the absorption layer 13 due to difference in refractive index or the like between the diffraction layer 11 and the absorption layer 13. In addition, another part of the light that has passed through the diffraction layer 11 is reflected or scattered at the interface between the absorption layer 13 and the second substrate 15 or inside the second substrate 15 due to difference in refractive index or the like between the absorption layer 13 and the second substrate 15.

Therefore, light emitted from the diffraction elements toward the fixed point on the observation side enters the observer's eye together with the reflected or scattered light, so that the diffracted light emitted from the diffraction elements will have a lower chroma level than that of the hue of the diffracted light.

As described above, each diffraction unit 30 has a size of emitting the light from the three diffraction elements as light of mixed rays. If none of the diffraction elements of each diffraction unit 30 aligns with the absorption part 22, chroma levels of the light emitted from the diffraction elements become substantially the same. Thus, as described above, light emitted from a single diffraction unit 30 presents white color that is a mixture of red, green, and blue.

In contrast, in a portion where the diffraction elements align with the respective absorption parts 22 in plan view perpendicular to the front surface 11s of the diffraction layer 11, the light reflected or scattered after passing through the diffraction layer 11 is absorbed by the absorption parts 22 having a black color. Hence, diffracted light emitted from the diffraction elements is observed by the observer with the unwanted light being removed. Therefore, the diffracted light emitted from the diffraction elements aligning with the respective absorption parts 22 will have a higher chroma level than the diffracted light emitted from the diffraction elements not aligning with the absorption parts 22. As a result, the color of the light emitted from the diffraction units 30 concerned is visually recognized as the color of diffracted light with an enhanced chroma level.

As described above, in the first diffraction unit 30A, only the third diffraction element 33 aligns with the corresponding absorption part 22 in plan view perpendicular to the front surface 11s of the diffraction layer 11. Thus, chroma level of blue color increases in the diffracted light emitted from the third diffraction element 33. As a result, the light emitted from the first diffraction unit 30A is visually recognized as blue light.

In the second diffraction unit 30B, part of the second diffraction element 32 among the three diffraction elements aligns with the corresponding absorption part 22 in plan view perpendicular to the front surface 11s of the diffraction layer 11. In plan view perpendicular to the front surface 11s of the diffraction layer 11, the absorption part 22 aligns with part of the second diffraction element 32 including the center thereof, and has an elliptical shape substantially analogous to the second diffraction element 32.

Since only the second diffraction element 32 aligns with the corresponding absorption part 22, the diffracted light emitted from the second diffraction element 32 will have a higher chroma level in green color. Hence, the light emitted from the second diffraction unit 30B is visually recognized as green light.

In a configuration in which the absorption part 22 has a size and shape of fully aligning with the second diffraction element 32, chroma level of the diffracted light emitted from the second diffraction element 32 is enhanced substantially in its entirety. In a configuration in which the absorption part 22 has a size and shape partially aligning with the second diffraction element 32, diffracted light emitted from the aligned portion of the second diffraction element 32 will have a higher chroma level.

In other words, in plan view perpendicular to the front surface 11s of the diffraction layer 11, the degree of increase in chroma level of the light emitted from the diffraction element depends on the ratio of the area occupied by the absorption part 22 to the area of the corresponding diffraction element. More specifically, as the ratio of the area of the absorption part 22 to the area of the corresponding diffraction element becomes higher, a higher degree of increase is ensured in chroma level of the light emitted from the diffraction element. Conversely, as the ratio of the area of the absorption part 22 to the area of the corresponding diffraction element becomes lower, a lower degree of increase is resulted in chroma level of the light emitted from the diffraction element.

In the third diffraction unit 30C, the first and third diffraction elements 31 and 33 of the three diffraction elements align with the corresponding ones of the absorption parts 22 in plan view perpendicular to the front surface 11s of the diffraction layer 11.

The absorption part 22 aligning with the first diffraction element 31 has a size and shape of fully aligning with the first diffraction element 31. In other words, the absorption part 22 has an elliptical shape substantially similar to the first diffraction element 31. The absorption part 22 aligning with the third diffraction element 33 has a size and shape of fully aligning with the third diffraction element 33. In other words, the absorption part 22 has an elliptical shape substantially similar to the third diffraction element 33.

In such a third diffraction unit 30C, chroma level is enhanced in red color in the diffracted light emitted from the first diffraction element 31 and in blue color in the diffracted light emitted from the third diffraction element 33. Therefore, the diffracted light emitted from the third diffraction unit 30C is visually recognized as light that is a mixture of the red diffracted light and the blue diffracted light, i.e. a purple color.

As described above, according to the configuration in which a plurality of diffraction elements among the three diffraction elements of a single diffraction unit 30 align with the respective absorption parts 22, the color of diffracted light emitted from the diffraction unit 30 is visually recognized as a color that is a mixture of the colors of the diffracted light emitted from the respective diffraction elements.

As described above, the degree of increasing chroma level in the diffracted light emitted from the diffraction elements depends on the ratio of the area of the absorption parts 22 to the area of the respective diffraction elements in plan view perpendicular to the front surface 11s of the diffraction layer 11. Hence, in the configuration in which a plurality of diffraction elements align with the respective absorption parts 22, the ratio of the area of the absorption parts 22 to the area of the diffraction elements is made different between the plurality of diffraction elements, so that the color of the diffracted light as emitted is varied between the diffraction units 30, even if the diffraction elements aligning with the respective absorption parts 22 are positionally the same between the diffraction units 30.

Moreover, each diffraction unit 30 is made up of the first diffraction element 31 of emitting red diffracted light, the second diffraction element 32 of emitting green diffracted light, and the third diffraction element 33 of emitting blue diffracted light. Thus, the color of emitted light can be varied between the diffraction units 30, making use of additive color mixing of the red light, the green light, and the blue light.

(Method of Producing Personal Verification Medium)

With reference to FIGS. 5 to 8, a description will be given of a method of producing a personal verification medium.

Figure 5:
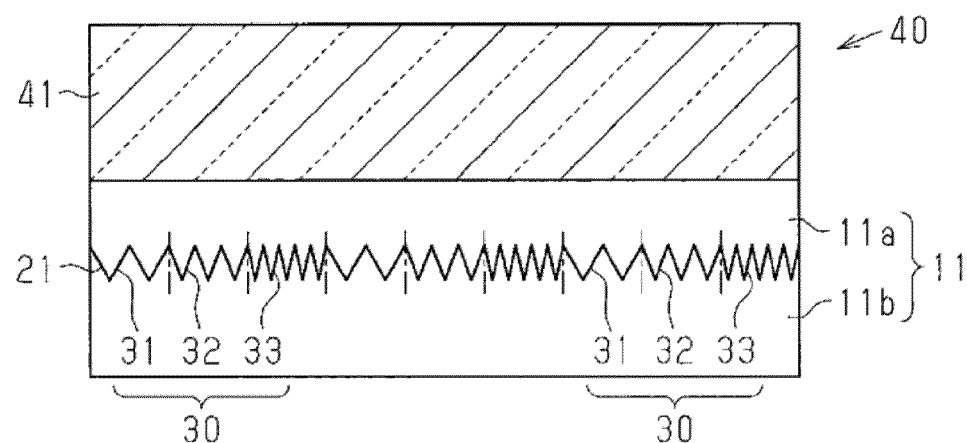
FIG. 5 is a cross-sectional view illustrating a structure of a transfer foil used for producing a personal verification medium.

As shown in FIG. 5, when producing a personal verification medium 10, a transfer foil 40 including a diffraction layer 11 is used.

The transfer foil 40 includes a support layer 41 and the diffraction layer 11. The diffraction layer 11 is mounted to the support layer 41 at a strength enabling peeling therefrom. The diffraction layer 11 includes a concavo-convex layer 11a including a diffraction part 21, and an adhesive layer 11b. The concavo-convex layer 11a has a surface contacting the support layer 41 and corresponding to the front surface 11s of the diffraction layer 11 described above, and a surface on a side opposite to the surface contacting the support layer 41, i.e. an uneven surface serving as diffraction gratings configuring the diffraction part 21.

The transfer foil 40 may include an intermediate layer located between the support layer 41 and the diffraction layer 11, in addition to the support layer 41, the concavo-convex layer 11a, and the adhesive layer 11b. The diffraction layer 11 may include a reflection layer that enhances the optical effect on the uneven surface that serves as the diffraction part 21. The reflection layer may be fully or partially provided over the diffraction layer 11. The reflection layer, when partially provided, may be meshed. Any reflection layer may be used if it is a thin optically transmissive film. The material that can be used for forming the reflection layer may be an inorganic material. The inorganic material that can be used may be an inorganic compound. The inorganic compound that can be used may be metal or a metal compound. Examples of the metal compound that can be used include ZnS and TiO2. In the absence of the diffraction layer 11 from such a reflection layer, light can be reflected at the interface between the concavo-convex layer 11a and the adhesive layer 11b, i.e. at the diffraction part 21, due to the difference in refractive index between the concavo-convex layer 11a and the adhesive layer 11b.

When forming the transfer foil 40, the support layer 41 is firstly prepared. The support layer 41 is preferably a resin film made, for example, of polyethylene terephthalate (PET), polyethylene naphthalate (PEN), polypropylene (PP), or the like. Of these materials, one preferred to be used is a material that is less likely to be deformed or deteriorated due to the heat applied to the support layer 41 or the solvent contacting the support layer 41, when the concavo-convex layer 11a is formed.

Paper, synthetic paper, plastic multilayer paper, or resin-impregnated paper may also be used as the support layer 41. The support layer 41 preferably has a thickness of 4 µm or more. If the support layer 41 has a thickness of 4 µm or more, the support layer 41 can have a high physical strength preferable for the handling of the support layer 41. The support layer 41 preferably has a thickness in the range of 12 µm or more to 50 µm or less.

Then, a concavo-convex layer 11a is formed on a surface of the support layer 41. For example, the concavo-convex layer 11a is formed through the following processes. A coating liquid containing a material for forming a concavo-convex layer 11a is prepared, and the coating liquid is applied onto the surface of the support layer 41 to form a coating film. Then, an original plate is pressed against the coating film to form an uneven surface serving as the diffraction part 21. Then, with the original plate being pressed against the coating film, the coating film is cured to thereby obtain a concavo-convex layer 11a.

The material for forming the concavo-convex layer 11a may, for example, be a thermoplastic resin or a thermosetting resin. Specifically, the thermoplastic resin may be an acrylic resin, an epoxy resin, a cellulose resin, a vinyl resin, or the like. The thermosetting resin may be a urethane resin, a melamine resin, an epoxy resin, a phenolic resin, or the like.

The material for forming the concavo-convex layer 11a may be a photopolymer. Examples of the photopolymer include a monomer, an oligomer, and a polymer having an ethylenically unsaturated bond or an ethylenically unsaturated group. Examples of the monomer include 1,6-hexanediol, neopentyl glycol diacrylate, trimethylolpropane triacrylate, pentaerythritol triacrylate, pentaerythritol tetraacrylate, dipentaerythritol pentaacrylate, dipentaerythritol hexaacrylate, and the like. Examples of the oligomer include epoxy acrylate, urethane acrylate, polyester acrylate, and the like. Examples of the polymer include a urethane-modified acrylic resin, an epoxy-modified acrylic resin, and the like. Since the materials mentioned above are only examples of photopolymers, other photopolymers may be used.

Then, an adhesive layer 11b is formed on the diffraction part 21 of the concavo-convex layer 11a. The adhesive layer 11b serves as a layer for bonding the diffraction layer 11 of the transfer foil 40 to the absorption layer 13 serving as a layer to be transferred. The adhesive layer 11b may be formed of an adhesive containing, for example, a polyester resin, a urethane resin, an acrylic resin, a vinyl chloride resin, and the like as main components. In other words, the material for forming the adhesive layer 11b may be a polyester resin, a urethane resin, an acrylic resin, a vinyl chloride resin, and the like. The thickness of the adhesive layer 11b may be appropriately selected according to usage, but may normally be in the range of approximately 0.1 µm or more to 10 µm or less, and preferably 1 µm or more to 5 µm or less.

If the diffraction layer 11 is configured with a reflection layer provided to the diffraction part 21 of the concavo-convex layer 11a, the reflection layer may be formed on the diffraction part 21 before forming the adhesive layer 11b thereon. For example, a reflection layer made of ZnS, TiO2, or the like mentioned above may be formed by sputtering, vacuum deposition, or other methods.

Then, a first substrate 14, a second substrate 15, a third substrate 16, and an absorption layer 13 are prepared. A resin film may be used for the first substrate 14, the second substrate 15, and the third substrate 16. The material for forming the resin film may be a thermoplastic resin. Examples of the thermoplastic resin that can be used include polyethylene terephthalate (PET), polyethylene naphthalate (PEN), polypropylene (PP), a polyvinyl chloride resin (PVC), an amorphous polyester resin (PET-G), a polycarbonate resin (PC), and the like.

In particular, PVC, PET-G, or PC, which have been traditionally used for the substrate of various kinds of cards and passports, is preferably used as a material for the substrates to facilitate the processing of integrating these substrates into a laminate by heat or pressure.

The second substrate 15 having a white color may be formed of any of these materials, with an addition of a white pigment, dye, and the like.

The absorption layer 13 may be formed of polycarbonate to which an energy absorbing material absorbing a laser beam of a predetermined wavelength has been added. Examples of the absorption layer 13 include LEXAN® series SD8B94 of SABIC Corporation.

The first, second and third substrates 14, 15 and 16, and the absorption layer 13 each preferably have a thickness in the range of 50 µm or more to 400 µm or less. When these substrates and layer each have a thickness of 50 µm or more, they can have a physical strength that is preferable for the handling of them. Thus, the first, second and third substrates 14, 15 and 16, and the absorption layer 13 can be easily handled. In particular, if the second substrate 15 has a thickness of at least 50 µm, wrinkles or the like are less likely to occur in the second substrate 15 when the printed part 12 is formed thereon.

In addition, when the first, second and third substrates 14, 15 and 16, and the absorption layer 13 each have a thickness of 400 µm or less, the uneven thickness or warpage, if any, of these substrates and layer is less likely to affect the process of producing the personal verification medium 10. It is more preferable that the first, second and third substrates 14, 15 and 16, and the absorption layer 13 each have a thickness in the range of 75 µm or more to 100 µm or less.

It is preferable that the printed part 12 is formed in advance on a surface of the second substrate 15. For example, the printed part 12 serves as an element of containing the personal information mentioned above or other pieces of predetermined information. The printed part 12 may have any color and may contain information expressed not only by characters or numerals mentioned above, but also by predetermined symbols or patterns.

The material for forming the printed part 12 may, for example, be an ink. The ink that can be used may be an offset ink, a letterpress ink, a gravure ink, or other inks, depending on the printing method. In terms of composition-basis classification of inks, the material for forming the printed part 12 may, for example, be a resin ink, an oil-based ink, a water-based ink, or the like. Further, the material for forming the printed part 12 may also be, for example, an oxidative polymerization type ink, a penetrative drying type ink, an evaporation drying type ink, an ultraviolet curable ink, or the like, depending on the difference in the method of drying ink.

Furthermore, the material for forming the printed part 12 may be a functional ink. The printed part 12, when formed by use of a functional ink, changes its color, depending on the angle of applying light thereto, the angle of observing it, or the like. Examples of the functional ink include an optically variable ink, a color shift ink, and a pearl ink.

Alternatively, the printed part 12 may be formed by electrophotography, using toner. In this case, the toner to be used is one that has been prepared, for example, by adhering color particles such as of graphite, pigment, or the like to plastic particles having electrostatic properties. Then, using the static electricity caused by electrostatic charge of the plastic particles, the toner is transferred onto the second substrate 15, i.e. an object to be printed, followed by heating the transferred toner, for fixation onto the second substrate 15. The printed part 12 is formed in this way.

Figure 6:
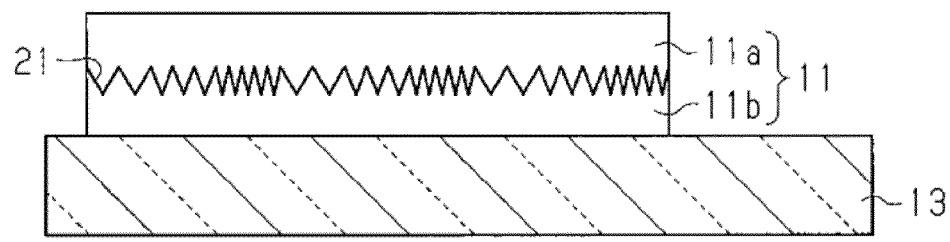
FIG. 6 is a process diagram illustrating a process according to the first embodiment in which a method of producing a laminate as a method of producing a personal verification medium is embodied.

As shown in FIG. 6, the diffraction layer 11 of the transfer foil 40 is transferred to a surface of the absorption layer 13. In this case, the adhesive layer 11b of the diffraction layer 11 is brought into contact with the absorption layer 13. In this state, a surface of the support layer 41 on a side opposite to the surface contacting the diffraction layer 11 is pushed toward the absorption layer 13, while performing heating, to thereby adhere the adhesive layer 11b to the absorption layer 13. Then, the support layer 41 is peeled off from the concavo-convex layer 11a, thereby transferring the diffraction layer 11 to the absorption layer 13.

Figure 7:
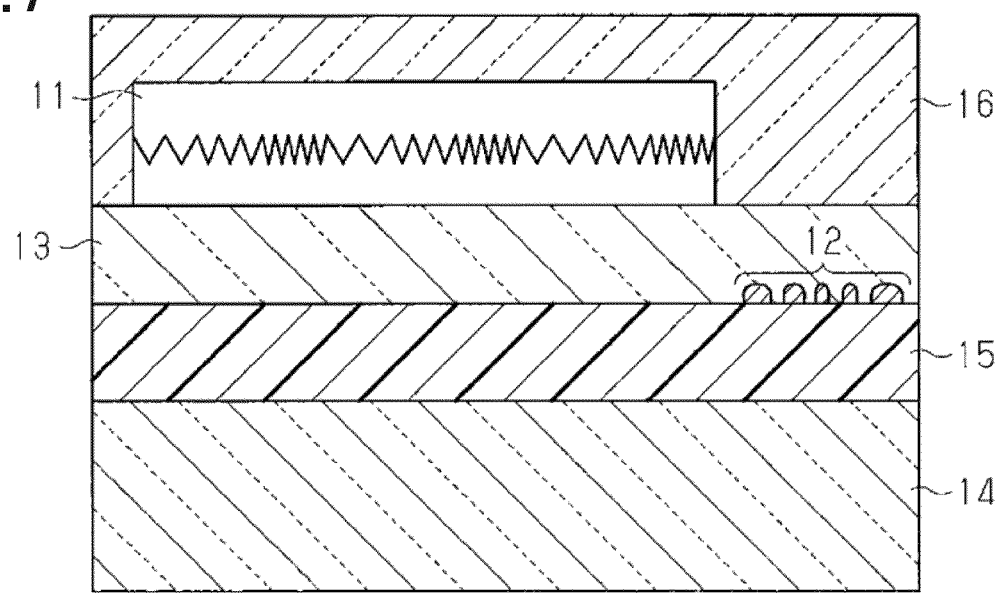
FIG. 7 is a process diagram illustrating a process in a method of producing a personal verification medium.

As shown in FIG. 7, a laminate is formed by laminating the first substrate 14, the second substrate 15 having the printed part 12, the absorption layer 13, the diffraction layer 11, and the third substrate 16. In this case, the second substrate 15 and the absorption layer 13 are permitted to face each other, and the first substrate 14, the second substrate 15, the absorption layer 13, the diffraction layer 11, and the third substrate 16 are stacked in this order. In this state, predetermined heat and pressure are applied to the stack to thereby laminate the plurality of layers.

Figure 8:
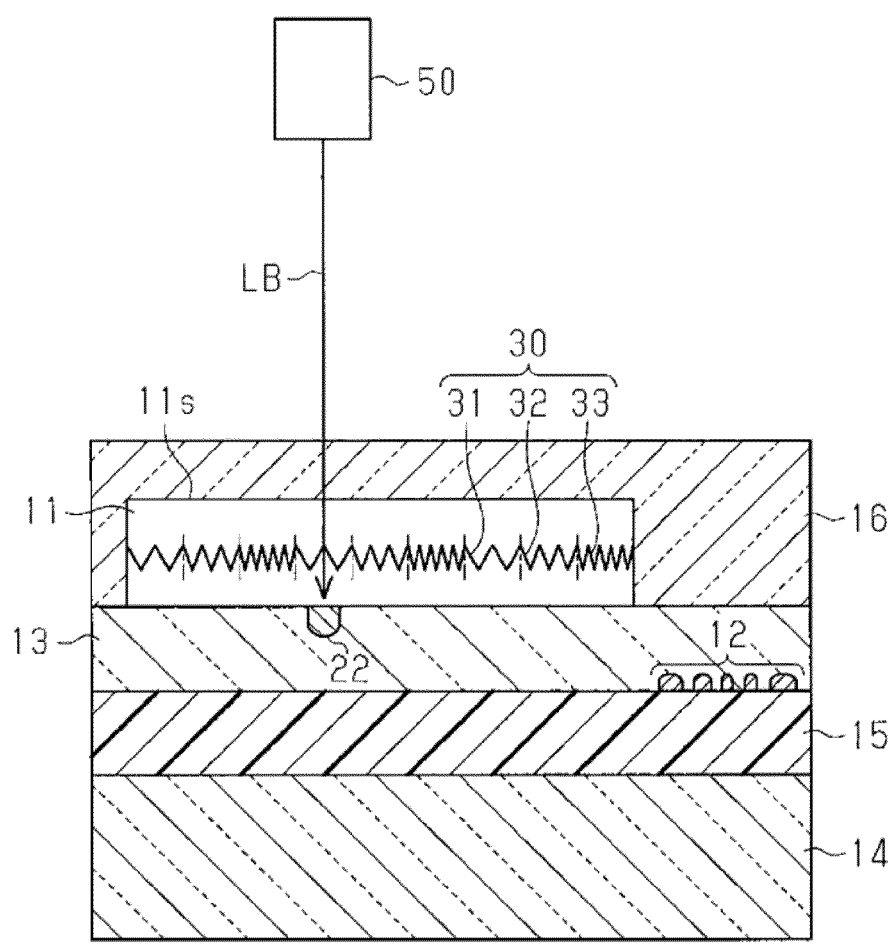
FIG. 8 is a process diagram illustrating a process in a method of producing a personal verification medium.

As shown in FIG. 8, in plan view perpendicular to the front surface 11s of the diffraction layer 11, a portion of the absorption layer 13 aligning with a predetermined diffraction element is irradiated with a laser beam LB by use of a laser printer 50. Thus, an absorption part 22 is formed in the portion of the absorption layer 13, thereby obtaining a personal verification medium 10 described above with reference to FIG. 2.

EXAMPLES

The following description addresses an example of the personal verification medium described above.

A PET film (Lumiller® 25T60, Toray Corporation) with a thickness of 25 µm was used as a support layer. A concavo-convex layer ink having the following composition was applied by gravure printing to the support layer so as to have a thickness of 2 µm. Then, a solvent contained in the concavo-convex layer ink was evaporated and removed, followed by roll-forming the resultant ink by use of a metal cylindrical plate having a concavo-convex relief. Thus, a concavo-convex layer having a diffraction part was formed.

It should be noted that the original plate used as the concavo-convex relief was one for forming a plurality of diffraction units in each of which a first diffraction element, a second diffraction element, and a third diffraction element were arrayed in this order. Also, in the roll formation, the metal cylindrical plate was pressed against the concavo-convex layer ink at a pressing force of 2 kgf/cm2, a pressing temperature of 240° C., and a pressing speed of 10 m/min.

Then, a transparent reflection layer was formed on the diffraction part by vacuum vapor deposition. The reflection layer was formed using ZnS with a thickness of 600 Å. Then, an adhesive layer ink having the following composition was applied by gravure printing with a thickness of 4 µm. The solvent in the adhesive layer ink was evaporated and removed to thereby form an adhesive layer. Thus, a transfer foil including a diffraction layer was obtained.

(Concavo-convex layer ink)
Polymethyl methacrylate (PMMA) resin: 2 parts by mass
Low viscosity nitrocellulose: 12 parts by mass
Cyclohexanone: 10 parts by mass
(Adhesive Layer ink)
Polyester resin: 20 parts by mass
Methyl ethyl ketone: 40 parts by mass
Toluene: 50 parts by mass A polycarbonate substrate that develops color in response to laser beam radiation was used as an absorption layer. The diffraction layer of the transfer foil was adhered to the absorption layer by use of a hot stamp transfer machine, and the support layer was removed from the diffraction layer. LEXAN SD8B94 (manufactured by SABIC) with a thickness of 100 µm was used as a polycarbonate substrate. It should be noted that the hot stamp transfer machine used for transferring the foil against the absorption layer was set to a temperature of 120° C., and the pressing time was 1 second.

The absorption layer, onto which the first substrate, the second substrate, and the diffraction layer were transferred, and the third substrate were stacked in this order and laminated, with predetermined heat and pressure being applied. To obtain the laminate, the temperature was set to 200° C., the pressure was set to 80 N/cm2, and the time of lamination was 25 minutes. Then, part of the laminate was cut out in a shape of a card in plan view perpendicular to the front surface of the diffraction layer.

The first substrate used was LEXAN SD8B14 (manufactured by SABIC Corporation) with a thickness of 100 µm, and the second substrate used was LEXAN SD8B24 (manufactured by SABIC) with a thickness of 400 The third substrate used was LEXAN SD8B14 (manufactured by SABIC) with a thickness of 200 µm.

The absorption layer of the laminate was irradiated with a laser beam by use of a fiber laser printer that emits a laser beam of a 1064-nm wavelength. A plurality of absorption parts were formed so as to each align with any corresponding one of the plurality of diffraction elements in plan view perpendicular to the front surface of the diffraction layer. In this case, the plurality of absorption parts were formed in the absorption layer so that a face-and-shoulders image with predetermined colors would be displayed with the plurality of diffraction elements and the plurality of absorption parts, relative to a fixed point on the observation side. Thus, a personal verification medium was obtained.

When the personal verification medium was observed from the observation-side fixed point, the face-and-shoulders image with predetermined colors was recognized as being displayed. Also, when the personal verification medium was observed from a point other than the fixed point, it was recognized that the face-and-shoulders image with the predetermined colors was not displayed. That is, it was recognized that the face-and-shoulders image displayed on the personal verification medium had an optical effect different from that of an image obtained by printing using an ink or the like. Furthermore, when the personal verification medium was destroyed and the diffraction layer was peeled from the absorption layer, it was recognized that the face-and-shoulders image with the predetermined colors was no longer displayed.

According to the first embodiment of a laminate, a personal verification medium, and a method of producing the laminate, the following advantageous effects are achieved.

(1) The light emitted from the diffraction elements aligning with the respective absorption parts 22 exhibits a high chroma level, compared to the light emitted from the diffraction elements other than these diffraction elements in question. Therefore, the personal verification medium 10 can display an image formed of light with a higher chroma level. For this reason, the degree of freedom is enhanced in the configuration of an image relative to the configuration of the diffraction layer 11.

(2) The absorption parts 22 can be formed in the absorption layer 13 in a state where the diffraction layer 11 and the absorption layer 13 face with each other. Thus, positional accuracy of the absorption parts 22 is enhanced relative to the respective diffraction elements provided to the diffraction layer 11, compared to the configuration in which the absorption parts 22 are firstly formed in the absorption layer 13 and then positioning of the absorption layer 13 is performed relative to the diffraction layer 11.

(3) In a portion of the absorption layer 13 where absorption parts 22 are provided, light that has passed through the diffraction layer 11 is prevented from being reflected or scattered at the interface between the diffraction layer 11 and the absorption layer 13, compared with the configuration in which absorption parts 22 are located inner than the front surface 13s of the absorption layer 13. Therefore, diffracted light emitted from the diffraction elements aligning with the respective absorption parts 22 is more likely to exhibit higher chroma level in plan view perpendicular to the front surface 11s of the diffraction layer 11. As a result, the image displayed on the personal verification medium 10 becomes sharper.

(4) Each diffraction unit 30 is made up of of the first diffraction element 31 of emitting red diffracted light, the second diffraction element 32 of emitting green diffracted light, and the third diffraction element 33 of emitting blue diffracted light. Thus, the color of emitted light can be varied between the diffraction units 30, making use of additive color mixing of the red light, the green light, and the blue light.

(5) It is easy to make the shape of each absorption part 22 be substantially analogous to the corresponding diffraction element in plan view perpendicular to the front surface 11s of the diffraction layer 11. This facilitates control of the ratio of the area of the absorption parts 22 to the area of the respective diffraction elements in plan view perpendicular to the front surface 11s of the diffraction layer 11.

Modifications of the First Embodiment

The first embodiment described above may be implemented by being appropriately modified as follows.

Personal information displayed on the personal verification medium 10 may be not only a face-and-shoulders image of the owner, but also information such as nationality, date of birth, name, and the like. These pieces of information may be made up of characters, patterns, and the like.

Each diffraction element may be in a circular shape. Such a configuration can also achieve an advantageous effect substantially equivalent to that of the configuration in which each diffraction element is in an elliptical shape, i.e., achieve an advantageous effect equivalent to item (5) set forth above.

Each diffraction element may be in a rectangular shape, for example, other than circular or elliptical shape. Furthermore, the first, second and third diffraction elements 31, 32 and 33 do not have to be in the same shape and size, but may be in an analogous shape with a different size, or may be in a different shape with a different size. In plan view perpendicular to the front surface 11s of the diffraction layer 11, as the ratio of the area occupied by the diffraction elements to the area occupied by the diffraction unit 30 increases, the intensity of the diffracted light emitted from the diffraction elements increases.

Diffraction unit 30 may include two diffraction elements each having a spatial frequency different from the other, or may include four or more such diffraction elements having spatial frequencies different from each other. Alternatively, each diffraction unit 30 may be configured by a single diffraction element having a particular spatial frequency. Furthermore, each diffraction element does not have to have a spatial frequency of causing the element to emit red, green or blue diffracted light, but may have a spatial frequency of causing the element to emit diffracted light of other color. Such a configuration also enables formation of the configuration of an image to be displayed on the personal verification medium, through the diffracted light emitted from the diffraction elements that align with the respective absorption parts 22 in plan view perpendicular to the front surface 11s of the diffraction layer 11, and thus achieves an advantageous effect similar to item (1) set forth above.

The absorption parts 22 may have not only a black color but also another color having a predetermined hue i.e. a color that absorbs at least part of visible light. Such a configuration also achieves an advantageous effect similar to item (1) set forth above as long as the absorption parts absorb visible light.

The absorption parts 22 may be located at a portion inside the absorption layer 13 i.e. a portion not exposed to the front and rear surfaces 13s and 13r of the absorption layer 13, or may be exposed to the rear surface 13r and may extend to a position closer to the rear surface 13r than to the front surface 13s in the thickness direction of the absorption layer 13. Alternatively, the absorption parts 22 may be exposed to both the front and rear surfaces 13s and 13r of the absorption layer 13 and may be located across the front and rear surfaces 13s and 13r of the absorption layer 13.

The absorption layer 13 does not have to be a one that develops color in response to laser beam radiation. In such a configuration, the absorption parts may be formed, for example, of ink or toner having a color that absorbs at least part of visible light. Such a configuration also enables formation of a predetermined image using the diffracted light emitted from the diffraction elements that align with the respective absorption parts in plan view perpendicular to the front surface 11s of the diffraction layer 11, and thus achieves an advantageous effect similar to item (1) set forth above.

Another optically transmissive layer may be provided between the diffraction layer 11 and the absorption layer 13. Such a configuration also allows the light passing through the diffraction layer 11 to reach the absorption layer 13, and thus achieves an advantageous effect similar to item (1) set forth above.

The absorption parts 22 may each be in a shape different from that of the corresponding one of the diffraction elements in plan view perpendicular to the front surface 11s of the diffraction layer 11. Such a configuration also enables formation of a predetermined image using the diffracted light emitted from the diffraction elements that align with the respective absorption parts, and thus achieves an advantageous effect similar to item (1) set forth above.

The absorption layer 13 may have absorption parts that absorb at least part of visible light at a portion overlapping with a portion of the diffraction layer 11 other than the diffraction elements, in plan view perpendicular to the front surface 11s of the diffraction layer 11. Such absorption parts can prevent or reduce mixing of diffracted light emitted from each diffraction element, with diffracted light emitted from the adjacent diffraction elements. Also, these absorption parts can prevent or reduce emission of light to the outside of the personal verification medium 10 from a part other than the diffraction elements. Thus, the chroma level of the light emitted from the diffraction units 30 is prevented from being lowered.

Figure 9:
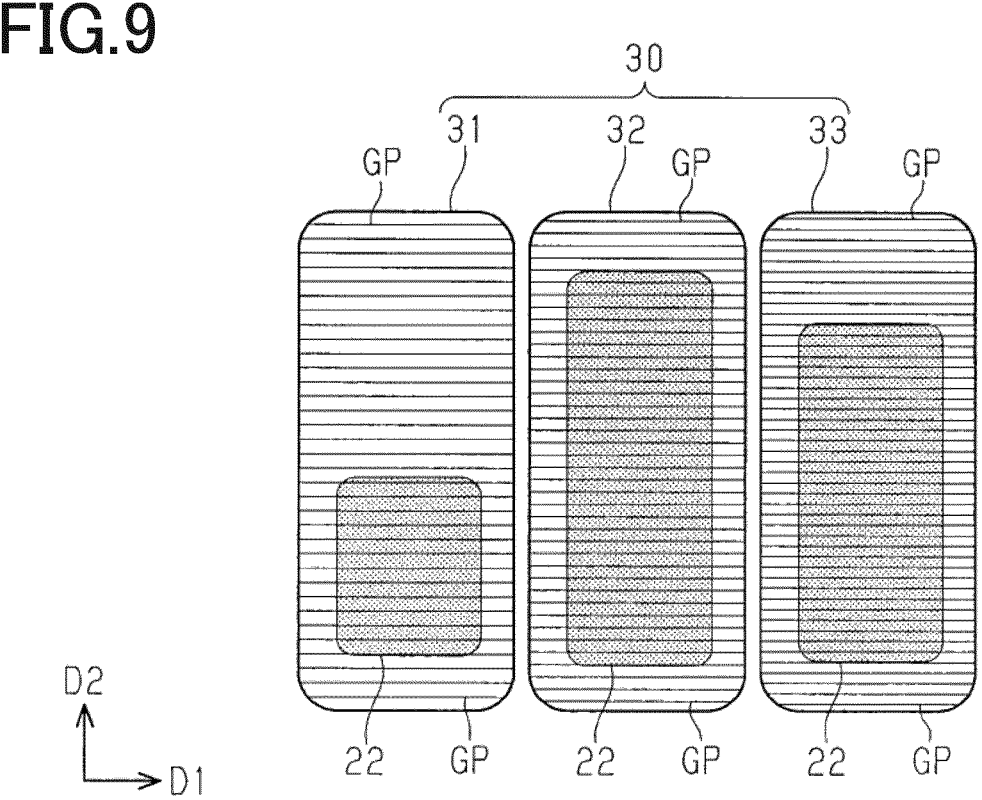
FIG. 9 is a partially enlarged plan view illustrating a structure of a diffraction layer as viewed perpendicular to a surface of a diffraction layer.
Figure 10:
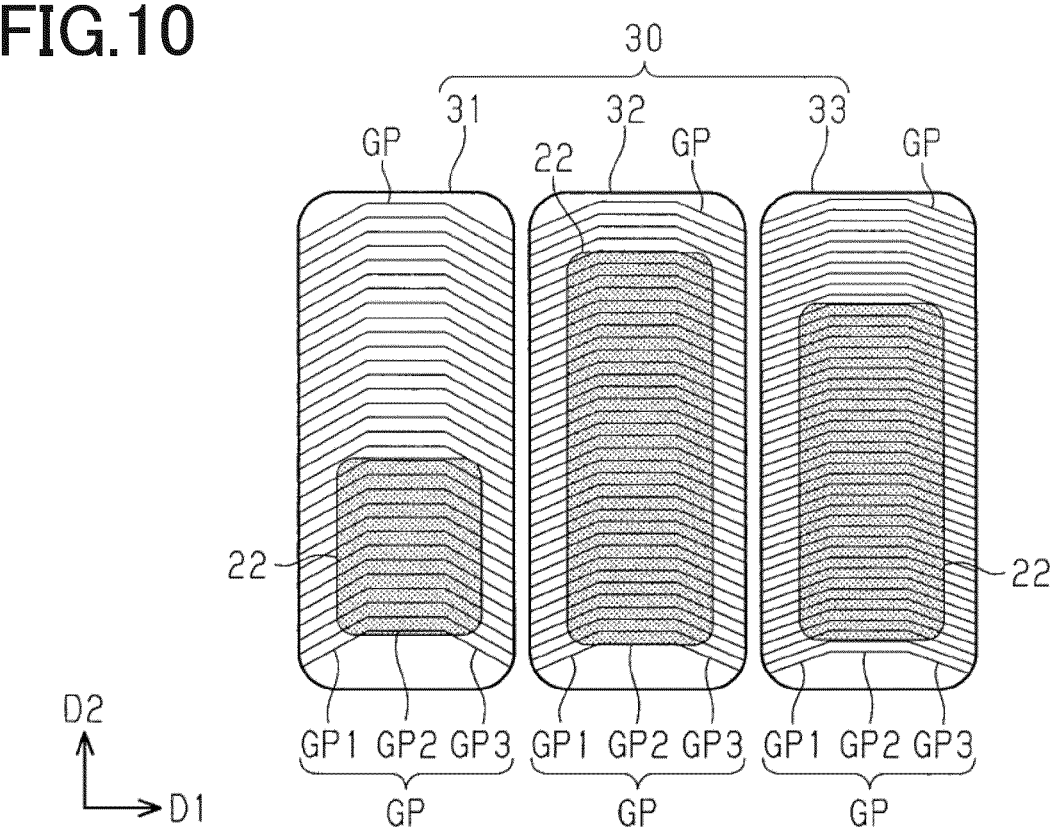
FIG. 10 is a partially enlarged plan view illustrating a structure of a diffraction layer as viewed perpendicular to a surface of a diffraction layer.

Referring now to FIGS. 9 and 10, a description will be given of the diffraction gratings configuring respective diffraction elements. FIGS. 9 and 10 each show an example of diffraction elements each having a rectangular shape in plan view perpendicular to the front surface 11s of the diffraction layer 11, and an example of respective absorption parts 22 each having a rectangular shape in plan view perpendicular to the front surface 11s of the diffraction layer 11.

As shown in FIG. 9, the diffraction grating of each diffraction element has a configuration where a grating pattern, i.e. unidirectionally extending grooves, are repeated in a direction perpendicular to the extending direction. The extending direction, for example, is a first direction D1, and the direction perpendicular to the extending direction is a second direction D2. Spatial frequency also refers to the number of grating patterns per unit length. FIGS. 9 and 10 each show diffraction gratings each having a grating pattern GP as indicated by the solid lines.

As described above, the first diffraction element 31 has a spatial frequency of emitting red light, the second diffraction element 32 has a spatial frequency of emitting green light, and the third diffraction element 33 has a spatial frequency of emitting blue light. Therefore, in the three diffraction elements, the first diffraction element 31 has the smallest spatial frequency, the third diffraction element 33 has the largest spatial frequency, and the second diffraction element 32 has a spatial frequency therebetween.

As shown in FIG. 10, the grating pattern GP of each diffraction element does not have to be made up of the grooves unidirectionally extending in the first direction D1. For example, each grating pattern GP may be made up of three kinds of elements i.e. first grating elements GP1, second grating elements GP2, and third grating elements GP3, which are arrayed in this order in the first direction D1. In each grating pattern GP, the second grating elements GP2 may extend in the first direction D1, while the first and third grating elements GP1 and GP3 may extend in a direction intersecting the first direction D1. More specifically, the first and third grating elements GP1 and GP3 may extend in respective directions so as to be linearly symmetrical about an axis extending in the second direction D2.

In each diffraction element, the plurality of first grating elements GP1 may extend, being parallel to each other and may be arrayed in the second direction D2, satisfying the spatial frequency unique to the diffraction element. The plurality of the third grating elements GP3 may extend, being parallel to each other and may be arrayed in the second direction, satisfying the spatial frequency unique to the diffraction element.

In each diffraction grating, diffracted light is emitted over the planes extending in directions perpendicular to the respective grating patterns. Therefore, the direction of emitting diffracted light is different between the first, second and third grating elements GP1, GP2 and GP3.

Due to the difference in the emission direction, the observer can easily visually recognize the light emitted from the diffraction elements, when observing the personal verification medium 10 in a direction inclined from the direction normal to the front surface 10s of the personal verification medium 10. In addition, when the diffraction layer 11 is transferred to the absorption layer 13 so that the second grating elements GP2 are inclined from the first direction D1, the diffracted light emitted from the first grating elements GP1 or the third grating elements GP3 also easily reaches the plane including the normal line of the front surface 10s of the personal verification medium 10 and extending in the second direction D2. Thus, when the second grating elements GP2 extend in a direction intersecting the first direction D1 as well, the observer observing the personal verification medium 10 from the direction normal to the front surface 10s can easily visually recognize the diffracted light emitted from the diffraction elements.

The diffraction grating configuring each diffraction element may be the following grating with the following cross section perpendicular to the direction in which the grating patterns configuring the diffraction grating extend. Specifically, the diffraction grating may be a laminar diffraction grating with a square wave cross section, a blazed diffraction grating with a saw-tooth cross section, or a holographic diffraction grating with a sinusoidal cross section.

Second Embodiment

Referring to FIGS. 11 to 14, a description will be given of a second embodiment in which a laminate, a personal verification medium, and a method of producing the laminate of the present invention are embodied. The second embodiment differs from the first embodiment in that the personal verification medium, which is an example of a laminate, has a detection target whose position is detected by a detection device. The following description will be focused on the difference and omit description on the components of the second embodiment, which are common to the first embodiment by giving them the same reference sings as those of the first embodiment. In addition, the following description sequentially addresses a personal verification medium as an example of a laminate, and a method of producing the personal verification medium as an example of a method of producing the laminate.

(Configuration of Personal Verification Medium)

Figure 11:
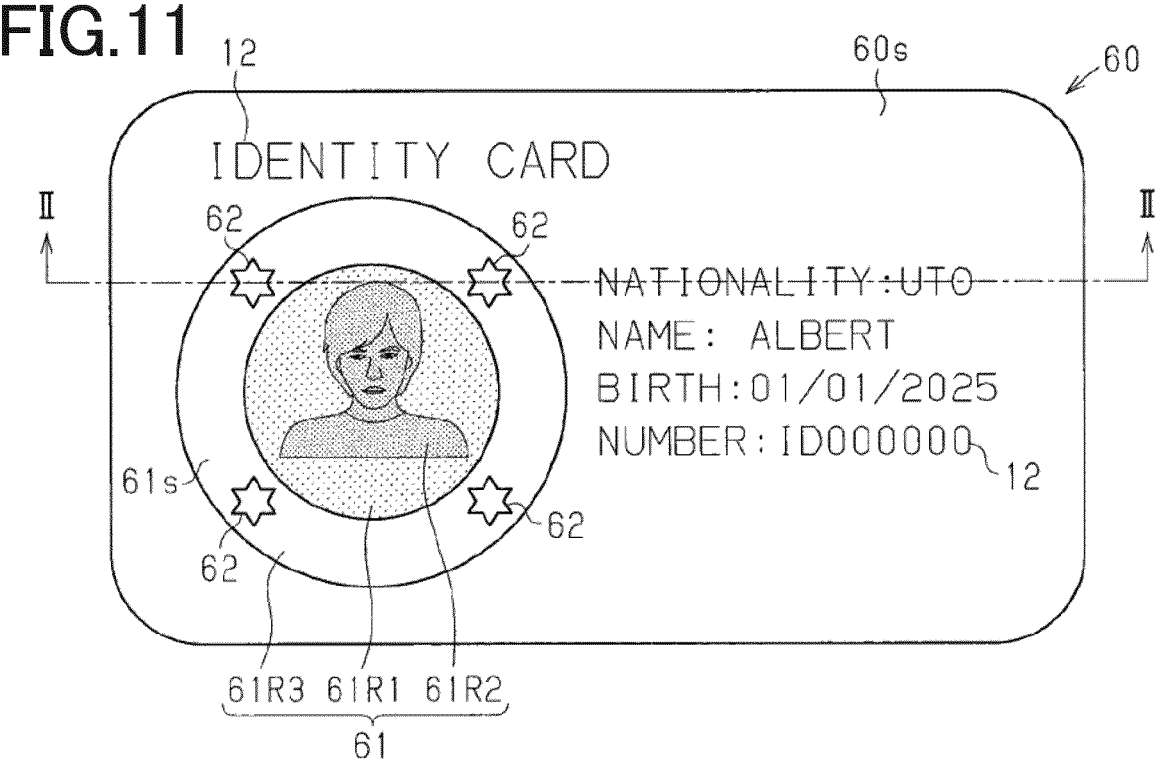
FIG. 11 is a plan view illustrating a structure of a personal verification medium according to a second embodiment in which a laminate and a personal verification medium are embodied.
Figure 12:
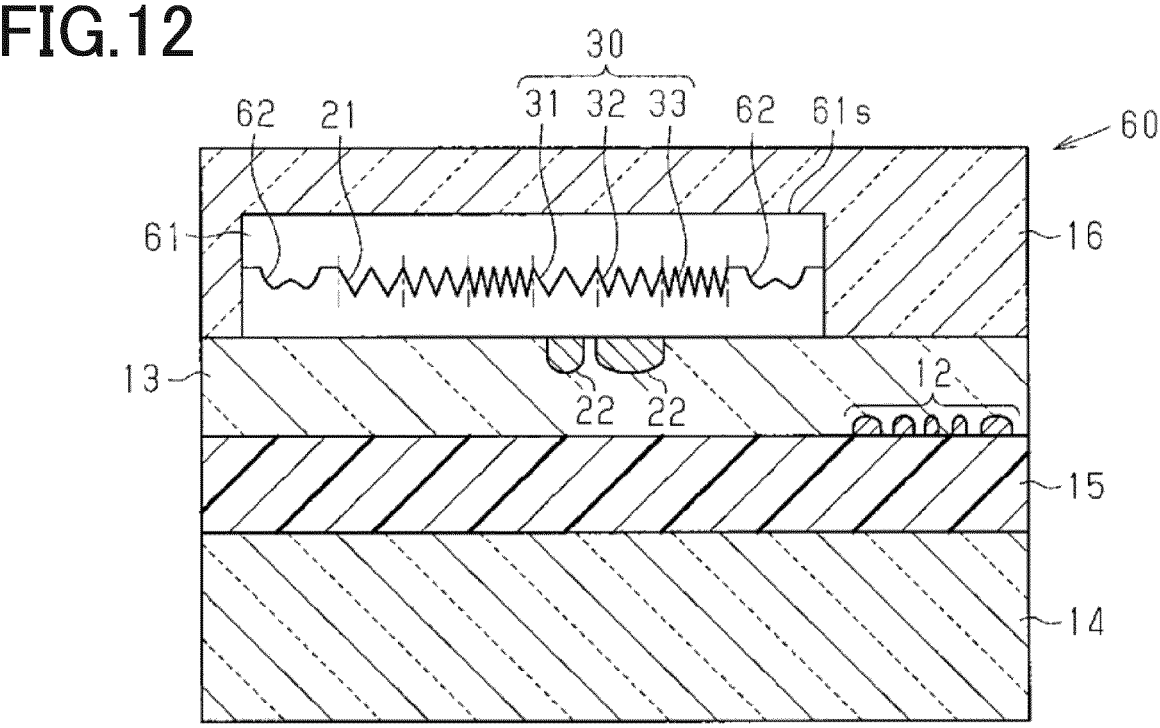
FIG. 12 is a cross-sectional view taken along the line II-II of FIG. 11.

Referring to FIGS. 11 and 12, a configuration of the personal verification medium will be described.

As shown in FIG. 11, a personal verification medium 60 has a two-dimensionally extending plate shape and a front surface 60s which also extends two-dimensionally, similar to the personal verification medium 10 of the first embodiment. In plan view perpendicular to the front surface 60s, the personal verification medium 60 is provided with a diffraction layer 61 in part thereof.

The diffraction layer 61 includes light-emitting detection targets 62 each of which is configured such that a detection device can detect the positions of the targets, in plan view perpendicular to the front surface 60s of the personal verification medium 60 i.e. the front surface 61s of the diffraction layer 61. Each detection target 62 is configured such that a detection device can detect the position of the detection target 62 by use of light emitted from the detection target 62.

Thus, when applying a laser beam to the absorption layer 13 that faces the diffraction layer 61, the portion of the absorption layer 13 to be irradiated with the laser beam can be determined based on the positions of the detection targets 62 of the diffraction layer 61.

The diffraction layer 61 is elliptical and made up of a first area 61R1, a second area 61R2, and a third area 61R3. In the diffraction layer 61, the first area 61R1 surrounds the second area 61R2 and the third area 61R3 surrounds the first area 61R1 in plan view perpendicular to the front surface 60s. The first area 61R1 corresponds to the first area 11R1 of the first embodiment, and the second area 61R2 corresponds to the second area 11R2 of the first embodiment. The diffraction layer 61 may be non-elliptical, e.g., polygonal, in a plan view perpendicular to the front surface 60s.

In the third area 61R3, a plurality of, specifically four, detection targets 62 are located. The four detection targets 62 are located surrounding the second area 61R2. Each detection target 62 is in an astral shape.

Any number of detection targets 62 may be provided as long the number is one or more. A higher number of detection targets 62 leads to higher accuracy of position detection by use of the detection targets 62. The size of the personal verification medium 60 is usually limited, and so is the size of the diffraction layer 61. Therefore, a larger number of the detection targets 62 leads to a smaller second area 61R2 relative to the diffraction layer 61 i.e. a smaller area for forming absorption parts. For this reason, the number of the detection targets 62 is preferably one or two in terms of minimizing reduction of the second area 61R2 relative to the diffraction layer 61.

In each detection target 62, a maximum dimension in a direction parallel to the front surface 60s of the personal verification medium 60 and a maximum dimension in a direction perpendicular to the former direction are preferably in the range of 0.1 mm or more and 5 mm or less. When the maximum dimensions are 0.1 mm or more, a detection device can easily detect the detection targets 62. When the maximum dimensions are 5 mm or less, the second area 61R2, i.e. the area where the absorption parts can be formed, is prevented from becoming excessively small relative to the diffraction layer 61.

FIG. 12 shows a cross-sectional structure of the personal verification medium 60 taken along the line II-II of FIG. 11. In FIG. 12, the thickness of the personal verification medium 60 and the size of the diffraction layer 61 relative to the size of the personal verification medium 60 are exaggerated for clarification. In FIG. 12, the personal verification medium 60 is illustrated with a significantly reduced number of diffraction elements provided to the diffraction layer 61, and hatching of the diffraction layer 61 is omitted for clarification of the diffraction part and the detection targets provided to the diffraction layer 61.

As shown in FIG. 12, the personal verification medium 60 includes a first substrate 14, a second substrate 15, an absorption layer 13, the diffraction layer 61, and a third substrate 16, as in the personal verification medium 10 of the first embodiment.

Each detection target 62 is configured by an uneven surface having fine concavities and convexities, i.e. a relief surface. Each detection target 62 serves as an optical element exhibiting a predetermined optical effect. Each detection target 62 may be at least one selected from the group consisting of a diffraction element for diffracting light, a reflection control element for controlling reflection of light, an isotropic scattering element for isotropically scattering light, an anisotropic scattering element for anisotropically scattering light, a lens element for refracting light, and a polarized reflection element for selectively reflecting predetermined polarized light. Thus, the position of each detection target 62 can be detected, based on the characteristics of light emitted from the optical element.

Of these elements of the group, the diffraction element configured by a diffraction grating serves as an element that emits diffracted light of a predetermined wavelength to a predetermined observation-side fixed point. The reflection control element is configured, for example, by uneven surface portions repeated at a pitch of not more than the wavelength of visible light, and serves as an element that transmits most of light incident thereon by controlling reflection at the interface of the reflection control element.

The isotropic scattering element is configured, for example, by an uneven surface where a plurality of concavities and convexities are irregularly arranged in plan view perpendicular to the front surface 61s of the diffraction layer 61. The anisotropic scattering element is configured, for example, by an uneven surface where a plurality of concavities and convexities are regularly arranged in plan view perpendicular to the front surface 61s of the diffraction layer 61.

The lens element serves as an element that refracts light for scattering or convergence. The polarized reflection element serves, for example, as an element that selectively reflects only one of P-polarized light and S-polarized light of the polarized light contained in the light incident on the polarized reflection element.

When each detection target 62 is a diffraction element or an anisotropic scattering element, it is preferable that the direction in which the diffraction part 21 emits diffracted light is different from the direction in which the detection target 62 emits diffracted light or scattered light. In other words, it is preferably so configured that, when the diffraction part 21 emits diffracted light to the observation-side fixed point, each detection target 62 emits diffracted light or scattered light to an observation-side point that is different from the observation-side fixed point.

When each detection target 62 is a lens element for converging light, it is preferable that the direction in which the diffraction part 21 emits diffracted light is different from the direction in which the detection target 62 converges light. In other words, it is preferably so configured that, when the diffraction part 21 emits diffracted light to the observation-side fixed point, each detection target 62 converges light to an observation-side point that is different from the observation-side fixed point.

Such a configuration can prevent the observer from visually recognizing the light emitted from the detection targets 62 simultaneously with the light emitted from the diffraction part 21 when the observer observes the personal verification medium 60. Thus, the observer's visual recognition of the light emitted from the diffraction part 21 is prevented from being lowered due to the light emitted from the detection targets 62.

(Method of Producing Personal Verification Medium)

Figure 13:
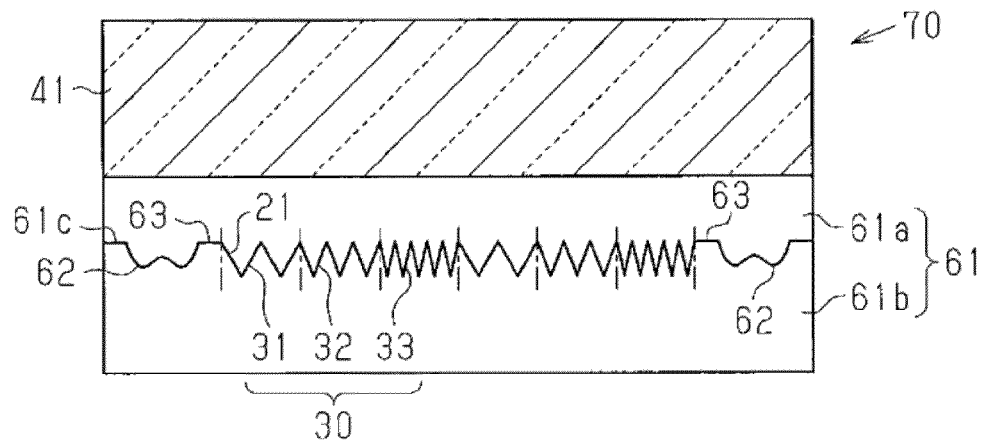
FIG. 13 is a cross-sectional view illustrating a structure of a transfer foil used for producing a personal verification medium.
Figure 14:
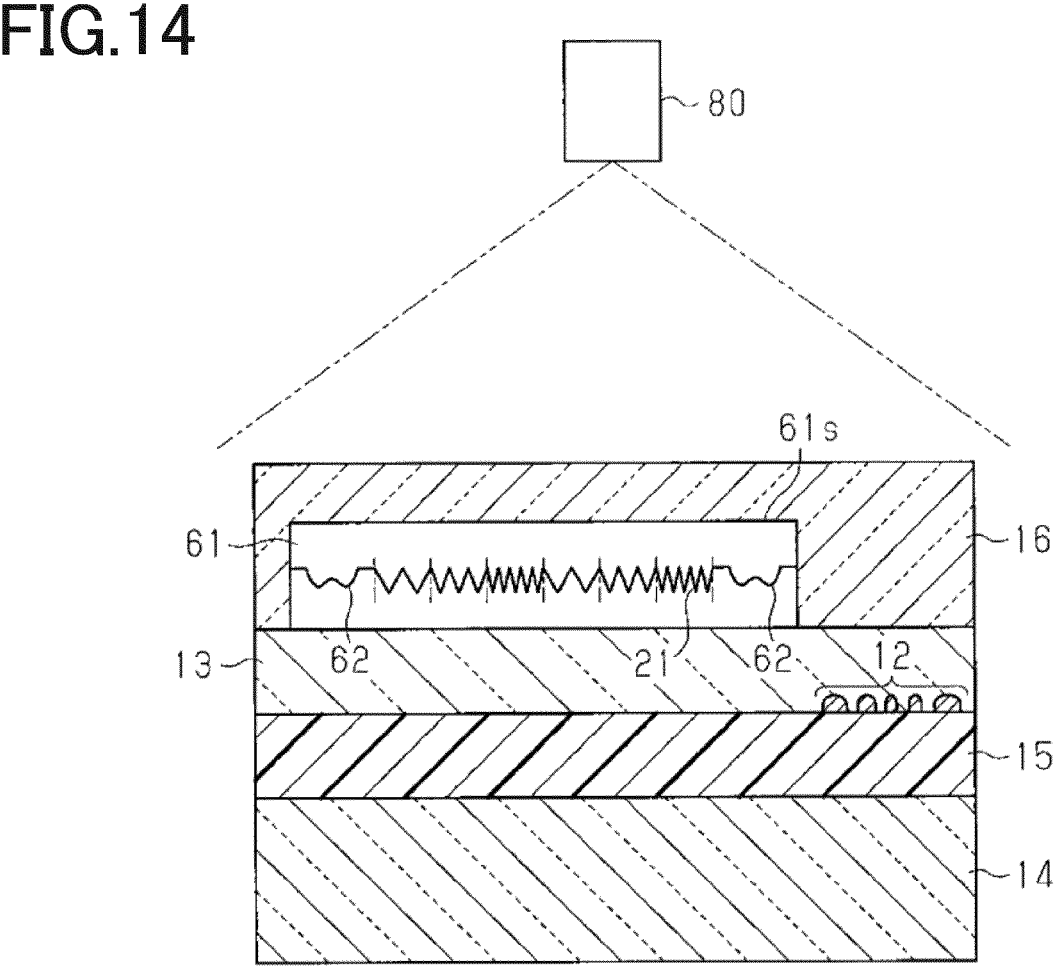
FIG. 14 is a process diagram illustrating a process according to the second embodiment in which a method of producing a laminate as a method of producing a personal verification medium is embodied.

Referring to FIGS. 13 and 14, a method of producing the personal verification medium will be described. The method of producing the personal verification medium according to the second embodiment is different from the method according to the first embodiment in the configuration of the transfer foil used for producing the medium, and in the position detection of the detection targets 62. The rest of the configuration is common to that of the first embodiment. The following description is focused on these differences.

The method of producing the personal verification medium 60 includes preparing a diffraction layer 61 including a diffraction part 21 and detection targets 62, preparing an absorption layer 13 having characteristics of developing color in response to laser beam radiation, and arranging the diffraction layer 61 and the absorption layer 13 face-to-face. The method of producing the personal verification medium 60 also includes detecting the positions of the detection targets 62 in plan view perpendicular to the front surface 61s of the diffraction layer 61 using a detection device, determining a portion of the absorption layer 13 that is irradiated with a laser beam, with reference to the positions of the detection targets 62, and irradiating the absorption layer 13 with a laser beam to form absorption parts 22.

As shown in FIG. 13, a transfer foil 70 includes a support layer 41 and a diffraction layer 61. The diffraction layer 61 is mounted to the support layer 41 at a strength enabling peeling therefrom. The diffraction layer 61 includes a concavo-convex layer 61a including a diffraction part 21 and detection targets 62, and an adhesive layer 61b. The concavo-convex layer 61a has a surface contacting the support layer 41 corresponding to the front surface 61s of the diffraction layer 61, and has a surface on a side opposite to the side contacting the support layer 41, serving as an uneven surface 61c that includes diffraction gratings configuring the diffraction part 21 and a relief surface configuring the detection targets 62. In other words, the diffraction layer 61 has the uneven surface 61c, with the diffraction part 21 and the detection targets 62 being located thereon.

The diffraction part 21 and the detection targets 62, which are located on the single uneven surface 61c, can be simultaneously formed. This enhances positional accuracy of the detection targets 62 relative to the position of the diffraction part 21, leading to the enhancement in positional accuracy of the absorption parts 22, which are formed based on the positions of the detection targets 62, relative to the positions of the respective diffraction elements.

In a cross section taken along the thickness direction, the diffraction layer 61 is provided with a flat surface 63 located between the diffraction part 21 that is an uneven surface, and a detection target 62 that is also an uneven surface. The diffraction part 21 and each detection target 62, with the flat surface 63 being located therebetween, are spaced apart from each other by a distance corresponding to the flat surface part. Thus, compared with a configuration in which the diffraction part 21 and the detection targets 62 are continuous, the light emitted from the detection targets 62 is unlikely to affect the diffracted light emitted from the diffraction part 21.

The diffraction layer 61 may include the diffraction part 21 and a reflection layer that enhances the optical effect on the uneven surface serving as the detection targets 62. The reflection layer may be a thin transparent film. Examples of the material that can be used for forming the reflection layer include ZnS, TiO2, and the like. The reflection layer may entirely cover the uneven surface 61c, or may cover only the diffraction part 21 and the detection targets 62 of the uneven surface 61c.

When forming such a transfer foil 70, a concavo-convex layer 61a is formed on a surface of the support layer 41. The concavo-convex layer 61a is formed, for example, through the following processes. A coating liquid that contains materials for forming the concavo-convex layer 61a is applied to the surface of the support layer 41 to form a coating film, followed by pressing an original plate against the coating film to form the uneven surface 61c which serves as the diffraction part 21 and the detection targets 62. Then, the coating film is cured, with the original plate being pressed against the coating film to thereby obtain a concavo-convex layer 61a.

Thus, the uneven surface serving as the diffraction part 21 and the uneven surface serving as the detection targets 62 can be formed as a continuous surface through a single process. When the diffraction part 21 and the detection targets 62 are formed as a continuous surface through a single process, high positional accuracy is achieved therebetween with only an error of approximately a few hundred nanometers. Thus, the absorption parts 22 can be more accurately aligned with the respective diffraction elements of the diffraction part 21.

In a configuration in which the uneven surface 61c of the concavo-convex layer 61a has a reflection layer, the reflection layer may be formed on the uneven surface 61c before the adhesive layer 61b is formed on the uneven surface 61c. For example, a reflection layer made of ZnS, TiO2, or the like mentioned above may be formed by sputtering, vacuum deposition, or other methods.

When forming a reflection layer, a mask that covers the flat surface 63 of the uneven surface 61c may be used to form a reflection layer located only on the diffraction part 21 and the detection targets 62. After the reflection layer is formed all over the uneven surface 61c, only the part thereof located on the flat surface 63 may be removed to form a reflection layer located only on the diffraction part 21 and the detection targets 62.

In the method of producing the personal verification medium 60, a laser printer, which is an example of the detection device, is used to detect the positions of the detection targets 62 before the laminate of the first substrate 14, the second substrate 15, the absorption layer 13, the diffraction layer 61, and the third substrate 16 is irradiated with a laser beam.

As shown in FIG. 14, a laser printer 80 includes a detection unit for detecting positions of the detection targets 62, in addition to an irradiation unit for irradiating the absorption layer 13 with a laser beam. The laser printer 80 detects the positions of the detection targets 62 based on the light emitted from each of the detection targets 62.

The laser printer 80 stores in advance information, for example, on the amount, the wavelength, or the like of the light emitted from each of the detection targets 62. The laser printer 80 acquires information on the light emitted from the laminate in plan view perpendicular to the front surface 61s of the diffraction layer 61, and compares the acquired information with the information stored in advance to detect the positions of the detection targets 62. In this case, in plan view perpendicular to the front surface 61s of the diffraction layer 61, the laser printer 80 determines a given position in each detection target 62 having a predetermined area to be a reference point for determining portions of the absorption layer 13 where the respective absorption parts 22 are to be formed.

The laser printer 80 also stores in advance information on the positions of the absorption parts 22 relative to the position of the detection target 62 i.e. the position of the reference point. Based on the results of detecting the detection target 62, the laser printer 80 determines portions of the absorption layer 13 to be irradiated with the laser beam. These portions are at predetermined distances and in predetermined directions from the position of the reference point.

Thus, in the method of producing the personal verification medium 60, the positions where the respective absorption parts 22 are formed are determined based on the positions of the detection targets 62 of the laminate for forming the personal verification medium 60.

When forming an image of predetermined colors by virtue of the emission of diffracted light from the diffraction layer 61 and the absorption of light into the absorption parts 22, the diffraction elements of the diffraction layer 61 are preferably highly accurately aligned with the respective absorption parts 22 with only an error of approximately a few micrometers, in terms of reducing difference between desired colors and the actual colors of the image.

As described above, the detection targets 62 and the diffraction part 21 are simultaneously formed through a single process by use of a single original plate. Therefore, highly accurate positioning is achieved with only an error of approximately a few hundred nanometers, between the positions of the detection targets 62 and the position of the diffraction part 21, i.e. the positions of the respective diffraction elements configuring the diffraction part 21, of the diffraction layer 61.

Therefore, by determining the positions of forming the absorption parts 22 based on the positions of the detection targets 62, accuracy is enhanced in the positions of forming the absorption parts 22 with respect to the respective diffraction elements that configure the diffraction part 21, with only an error of approximately a few micrometers.

In contrast, in the process of transferring the diffraction layer 61 to the absorption layer 13, the transfer is carried out with a positional error of approximately several millimeters in terms of accuracy. Likewise, when a diffraction layer 61 taken out of a personal verification medium 60 is bonded to the absorption layer of a counterfeit product, rather than to the absorption layer 13 of a genuine product, the diffraction elements of the diffraction layer 11 are aligned with the respective absorption parts of the absorption layer with a positional error of several millimeters in terms of accuracy, just as when the diffraction layer 61 is transferred to the absorption layer 13.

Thus, it is true that a counterfeit personal verification medium can display an image of the predetermined colors based on the absorption parts 22 formed in the absorption layer 13 and the respective diffraction elements of the diffraction layer 61. However, it is difficult for such a counterfeit personal verification medium to reproduce the desired colors of image, i.e. the colors which are equivalent to those of the genuine personal verification medium 60. Therefore, it is difficult to counterfeit or falsify the personal verification medium 60.

When the positions of forming the absorption parts 22 are determined based on a reference point outside the laminate, the alignment accuracy between the diffraction elements and the respective absorption parts 22 depends on the accuracy of positioning the laminate with respect to the external reference point. Since the laminate is highly accurately positioned with respect to the external reference point with only an error of approximately several dozen micrometers, the absorption parts 22 are also highly accurately aligned with the respective diffraction elements with only an error of approximately several dozen micrometers.

In other words, according to the configuration of forming the absorption parts 22 on the absorption layer 13 facing the diffraction layer 61, even use of an external reference point can ensure a higher positional accuracy of the absorption parts 22 with respect to the respective diffraction elements, than transferring the diffraction layer 61 to the absorption layer 13 where the absorption parts 22 are formed.

According to the second embodiment of a laminate, a personal verification medium, and a method of producing the laminate, the following advantageous effects are achieved in addition to the advantageous effects enumerated with items (1) to (5) set forth above.

(6) When applying a laser beam to the absorption layer 13 that faces the diffraction layer 61, the portions of the absorption layer 13 to be irradiated with the laser beam can be determined based on the positions of the detection targets 62 in the diffraction layer 61.

(7) The positions of the detection targets 62 can be detected, based on the characteristics of light emitted from the optical elements as the detection targets 62.

(8) The diffraction part 21 and the detection targets 62, which are located on the single uneven surface 61c, can be simultaneously formed. This enhances positional accuracy of the detection targets 62 relative to the position of the diffraction part 21, leading to the enhancement in positional accuracy of the absorption parts 22, which are formed based on the positions of the detection targets 62, relative to the positions of the respective diffraction elements.

Modification of the Second Embodiment

The second embodiment described above can also be implemented with appropriate modifications described below.

In the diffraction layer 61, the detection targets 62 may be located on a surface different from the surface where the diffraction part 21 is located. Such a configuration still achieves the advantageous effects equivalent to item (6) set forth above because portions of the absorption layer 13 irradiated with a laser beam can be determined based on the positions of the detection targets 62 of the diffraction layer 61.

In plan view perpendicular to the front surface 61s of the diffraction layer 61, the detection targets 62 may each be, for example, in a cruciform shape, a polygonal shape other than the astral shape, a circular shape, or the like, aside from the astral shape. Such a configuration achieves the advantageous effects equivalent to item (6) set forth above if the detection targets 62 are each configured such that the position thereof is detected by the light emitted therefrom.

The detection device for detecting the positions of the detection targets 62 may be separately provided from the laser printer that emits a laser beam. Such a configuration achieves the advantageous effects equivalent to item (6) set forth above, by determining portions of the absorption layer 13 to be irradiated with a laser beam of the laser printer, based on the positions of the detection targets 62 resulting from the detection performed by the detection device.

REFERENCE SIGNS LIST 10, 60 . . . Personal verification medium; 10s, 11s, 13s, 15s, 60s, 61s . . . Front surface; 11, 61 . . . Diffraction layer; 11a, 61a . . . Concavo-convex layer; 11b, 61b . . . Adhesive layer; 11R1, 61R1 . . . First area; 11R2, 61R2 . . . Second area; 12 . . . Printed part; 13 . . . Absorption layer; 13r . . . Rear surface; 14 . . . First substrate; 15 . . . Second substrate; 16 . . . Third substrate; 21 . . . Diffraction Part; 22 . . . Absorption part; 30 . . . Diffraction unit; 30A . . . First diffraction unit; 30B . . . Second diffraction unit; 30C . . . Third diffraction unit; 31 . . . First diffraction element; 32 . . . Second diffraction element; 33 . . . Third diffraction element; 40, 70 . . . Transfer foil; 41 . . . Support layer; 50, 80 . . . Laser printer; 61c . . . Uneven surface; 61R3 . . . Third area; 62 . . . Detection target; 63 . . . Flat surface; GP . . . Grating pattern; GP1 . . . First grating element; GP2 Second grating element; GP3 . . . Third grating element.

What is claimed is:

1. A laminate, comprising:
a diffraction layer that is optically transmissive and includes a diffraction part configured by a plurality of diffraction units, the plurality of diffraction units being repetition of a diffraction unit in a direction of extending the diffraction layer, each diffraction unit including at least one diffraction element configured by a reflective diffraction grating; and
an absorption layer that is optically transmissive and includes a plurality of absorption parts that absorb at least part of visible light, the absorption layer facing the diffraction layer in a state where light passes between the diffraction layer and the absorption layer, wherein:
the laminate has an observation side that is opposite to a side where the diffraction layer faces the absorption layer;
the diffraction layer has a surface serving as a front surface on a side opposite to the surface facing the absorption layer; and
in plan view perpendicular to the front surface of the diffraction layer, each of the absorption parts aligns with corresponding one of the diffraction elements, wherein the absorption layer contacts the diffraction layer;
the absorption layer has a surface contacting the diffraction layer and serving as a front surface; and
the absorption parts are exposed to the front surface of the absorption layer.

2. A personal verification medium, comprising:
a laminate that includes personal information belonging to a particular individual;
wherein the laminate is the laminate of claim 1; and
wherein the laminate is configured to display the personal information by absorption of light into the absorption parts and emission of diffracted light from part of the diffraction elements aligning with the respective absorption parts, in plan view perpendicular to the front surface of the diffraction layer.

3. A laminate, comprising:
a diffraction layer that is optically transmissive and includes a diffraction part configured by a plurality of diffraction units, the plurality of diffraction units being repetition of a diffraction unit in a direction of extending the diffraction layer, each diffraction unit including at least one diffraction element configured by a reflective diffraction grating; and
an absorption layer that is optically transmissive and includes a plurality of absorption parts that absorb at least part of visible light, the absorption layer facing the diffraction layer in a state where light passes between the diffraction layer and the absorption layer, wherein:
the laminate has an observation side that is opposite to a side where the diffraction layer faces the absorption layer;
the diffraction layer has a surface serving as a front surface on a side opposite to the surface facing the absorption layer; and
in plan view perpendicular to the front surface of the diffraction layer, each of the absorption parts aligns with corresponding one of the diffraction elements, wherein each of the diffraction units is configured by a first diffraction element, a second diffraction element, and a third diffraction element;
the diffraction grating configuring each diffraction element has a spatial frequency that is different between the first diffraction element, the second diffraction element, and the third diffraction element; and
difference in the spatial frequency between the diffraction elements and direction of repeating a unit structure contained in each of the diffraction elements are so determined that red diffracted light of the first diffraction element, green diffracted light of the second diffraction element, and blue diffracted light of the third diffraction element are simultaneously emitted toward a fixed point on the observation side.

4. A personal verification medium, comprising:
a laminate that includes personal information belonging to a particular individual;
wherein the laminate is the laminate of claim 3; and
wherein the laminate is configured to display the personal information by absorption of light into the absorption parts and emission of diffracted light from part of the diffraction elements aligning with the respective absorption parts, in plan view perpendicular to the front surface of the diffraction layer.

5. The laminate of claim 3, wherein:
the absorption layer has characteristics of developing color in response to laser beam radiation; and
the absorption parts correspond to portions that have developed color in response to the laser beam radiation.

6. The laminate of claim 5, wherein each of the diffraction elements is in a circular shape or in an elliptical shape, in plan view perpendicular to the front surface of the diffraction layer.

7. The laminate of claim 5, wherein:
the diffraction layer includes a detection target emitting light; and
the detection target is so configured that a detection device detects a position of the detection target in plan view perpendicular to the front surface of the diffraction layer, based on light emitted from the detection target.

8. The laminate of claim 7, wherein:
the detection target is an optical element; and
the detection target is at least one selected from a group consisting of a diffraction element diffracting light, a reflection control element controlling reflection of light, an isotropic scattering element isotropically scattering light, an anisotropic scattering element anisotropically scattering light, a lens element refracting light, and a polarized reflection element selectively reflecting predetermined polarized light.

9. The laminate of claim 8, wherein:
the diffraction layer has an uneven surface; and
the diffraction part and the detection target are located on the uneven surface.

10. A method of producing a laminate, comprising the steps of:
preparing a diffraction layer that is optically transmissive and includes a diffraction part and a detection target;
preparing an absorption layer that is optically transmissive and has characteristics of developing color in response to laser beam radiation;
permitting the diffraction layer to face the absorption layer;
detecting a position of the detection target in plan view perpendicular to the front surface of the diffraction layer by using a detection device;
determining portions of the absorption layer to be irradiated with the laser beam with reference to the position of the detection target; and
irradiating the absorption layer with the laser beam to form absorption parts, wherein
the absorption layer contacts the diffraction layer;
the absorption layer has a surface contacting the diffraction layer and serving as a front surface; and
the absorption parts are exposed to the front surface of the absorption layer.

11. A method of producing a laminate, comprising the steps of:
preparing a diffraction layer that is optically transmissive and includes a diffraction part and a detection target;
preparing an absorption layer that is optically transmissive and has characteristics of developing color in response to laser beam radiation;
permitting the diffraction layer to face the absorption layer;
detecting a position of the detection target in plan view perpendicular to the front surface of the diffraction layer by using a detection device;
determining portions of the absorption layer to be irradiated with the laser beam with reference to the position of the detection target; and
irradiating the absorption layer with the laser beam to form absorption parts
wherein:
each of the diffraction units is configured by a first diffraction element, a second diffraction element, and a third diffraction element;
the diffraction grating configuring each diffraction element has a spatial frequency that is different between the first diffraction element, the second diffraction element, and the third diffraction element; and difference in the spatial frequency between the diffraction elements and direction of repeating a unit structure contained in each of the diffraction elements are so determined that red diffracted light of the first diffraction element, green diffracted light of the second diffraction element, and blue diffracted light of the third diffraction element are simultaneously emitted toward a fixed point on the observation side.

12. The laminate of claim 3, wherein:
the absorption layer contacts the diffraction layer;
the absorption layer has a surface contacting the diffraction layer and serving as a front surface; and
the absorption parts are exposed to the front surface of the absorption layer.

* * * * *